United States Patent [19]
Arnold et al.

[11] Patent Number: 5,920,488
[45] Date of Patent: *Jul. 6, 1999

[54] METHOD AND SYSTEM FOR MAINTAINING A DESIRED AIR FLOW THROUGH A FUME HOOD

[75] Inventors: Bruce D. Arnold, Murrysville; David M. Fisher, Pittsburg; David C. McMasters, Monroeville; Christopher E. Kikta, Pittsburgh, all of Pa.

[73] Assignee: American Auto-Matrix, INc., Export, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,585

[22] Filed: Aug. 29, 1996

Related U.S. Application Data

[63] Continuation of application No. 08/056,291, Apr. 30, 1993, abandoned, which is a continuation-in-part of application No. 07/591,541, Oct. 1, 1990, Pat. No. 5,764,579.

[51] Int. Cl.⁶ ..................................................... G06F 19/00
[52] U.S. Cl. ...................... 364/528.1; 364/165; 364/157; 454/58; 454/239
[58] Field of Search ................................. 454/56–61, 62, 454/238, 239, 252; 364/131–137, 157, 164, 165, 528.1, 528.11, 172; 702/113, 114; 422/62, 105, 119

[56] References Cited

U.S. PATENT DOCUMENTS

| | | |
|---|---|---|
| 4,040,042 | 8/1977 | Mayer . |
| 4,160,407 | 7/1979 | Duym ......................................... 454/61 |
| 4,528,898 | 7/1985 | Sharp et al. ............................... 454/61 |
| 4,557,184 | 12/1985 | Orii et al. . |
| 4,706,553 | 11/1987 | Sharp et al. ............................... 454/61 |
| 4,741,257 | 5/1988 | Wiggin et al. ............................. 454/59 |
| 4,773,311 | 9/1988 | Sharp ........................................ 454/56 |

(List continued on next page.)

OTHER PUBLICATIONS

"Face Velocity Control Systems" brochure by Anemostat, copyright "Yamato Clean Benche" product description brochure.

Envirotrak—A Laboratory Air Flow Control System from Anemost dated Aug. 1985.

"Total Lab Control for the 90's TLC—90" by Anemostat, copyrighted in 1988.

(List continued on next page.)

*Primary Examiner*—Joseph Ruggiero
*Attorney, Agent, or Firm*—Reed Smith Shaw & McClay; Raymond A. Miller

[57] ABSTRACT

A system for maintaining a desired air flow through a fume hood having a sash. The system comprises a mechanism for controlling air flow through the fume hood based on at least one gain. The system is also comprised of a mechanism for automatically tuning the gain connected to the controlling mechanism. Additionally, the system is comprised of a mechanism for manually inputting information to the tuning mechanism so the tuning mechanism automatically provides a desired gain to the controlling mechanism based on information received from the input mechanism. Additionally, the present invention pertains to a qualitative tuning system for a processor. The present invention also pertains to a method for controlling air flow through a fume hood with a sash. The method comprises the steps of providing information concerning flow of air through the fume hood to a processor. Then, there is the step of manually inputting information concerning gain into a qualitative tuning system connected to the processor. Next, there is the step of automatically producing an adjustment to the gain to the processor by the qualitative tuning system based on the information. Then, there is the step of controlling the flow of air through the fume hood with the processor based on the gain it receives from the qualitative tuning system. The present invention pertains to a method for qualitatively tuning a processor. The present invention additionally pertains to a system for controlling a fume hood having a sash with a face.

18 Claims, 15 Drawing Sheets

U.S. PATENT DOCUMENTS

| | | | |
|---|---|---|---|
| 5,090,303 | 2/1992 | Ahmed | 454/58 |
| 5,090,304 | 2/1992 | Egbers et al. | 454/59 |
| 5,092,227 | 3/1992 | Ahmed | 454/59 |
| 5,205,783 | 4/1993 | Dieckert et al. | 454/61 |
| 5,215,497 | 6/1993 | Drees | 454/61 |
| 5,312,297 | 5/1994 | Dieckert et al. | 454/59 |

OTHER PUBLICATIONS

"SOLO/FX, Preliminary Production Description" dated Nov. 14, 1988.

"SOLO/FX" by American Auto–Matrix, copyrighted in 1989.

"NETWORK" by American Auto–Matrix dated Spring/Summer 1989.

"SOLO/FX Hood/Lab Control" by American Auto–Matrix dated about Jan. 1989.

Information Disclosure Statement/Declaration of Linda Diss and attachments thereto.

Information Disclosure Statement/Declaration of Richard Fish and attachments thereto.

C = A + B

B = 1 / A

C = A * B

IF C = 0 THEN D = B
IF C = 1 THEN D = A

D = TRUE (HOLD) FOR
(C / A) * B SECONDS

D = A * (B - C) + C
0% < A < 100%

E = MAXIMUM OF A, B,
C, OR D

METHOD AND SYSTEM FOR MAINTAINING A DESIRED AIR FLOW THROUGH A FUME HOOD

This application is a continuation of application Ser. No. 08/056,291 filed on Apr. 30, 1993, abandoned, which is a C-I-P of Ser. No. 07/591,541 filed Oct. 1,1990, now U.S. Pat. No. 5,764,579.

FIELD OF THE INVENTION

The present invention is related to controllers. More specifically, the present invention is related to a method, system and an apparatus for fume hood controllers. The controllers can be networkable, or qualitatively tuned or based on face velocity and sash position of the fume hood.

BACKGROUND OF THE INVENTION

Laboratories wherein dangerous experiments or processes are performed require protection for the workers and the experiments in the laboratory. One very common protection found in laboratories are fume hoods in which chemical reactions are conducted. The fume hoods have air drawn out of them thus essentially preventing any toxic fumes from escaping the fume hood into the laboratory and threatening the operators. The velocity of air drawn through the fume hood sash is controlled to a value high enough to maintain safety for the operator and low enough to provide non-turbulent air for the experiment of process.

An additional protection that can be provided is to maintain the static pressure in the laboratory at a lower or higher pressure than the pressure in the surrounding corridors of the building. A lower pressure would prevent contaminants from exiting the laboratory in the case of an accident.

A higher pressure would prevent contaminants from entering the laboratory, as is the case in a clean room. Also, control of the laboratory climate is required both for operator comfort and for certain experiments or processes where strict temperature and humidity control are necessary.

Moreover, in regard to the tuning of a processor, for instance, for fume hoods, there exists automatically tunable processors which respond to the system into which they are integrated. But after the processor is initially tuned to its system, to tune it in terms of how a user would like the processor to respond with respect to the system, the user must be fluent in operation of the operating system of the processor in order to retune it.

There are many schemes and apparatuses that provide such control and protection to laboratories. However, heretofore, there have been no systems that provide for integrated direct digital control of laboratories. Additionally, there have been no systems that are automatically tunable based on simple manual inputs to the system.

SUMMARY OF THE INVENTION

The present invention pertains to a system for maintaining a desired air flow through a fume hood having a sash. The system comprises means for controlling air flow through the fume hood based on at least one gain. The system is also comprised of means for automatically tuning the gain connected to the controlling means. Additionally, the system is comprised of means for manually inputting information to the tuning means so the tuning means automatically provides a desired gain to the controlling means based on information received from the input means.

The present invention also pertains to a control system. The control system is comprised of a processor which produces a control response based on at least one gain. The system is also comprised of means for automatically tuning the gain connected to the processor. Moreover, the control system comprises means for manually inputting information to the tuning means so the tuning means automatically provides a desired gain to the processor based on information received from the input means.

Additionally, the present invention pertains to a qualitative tuning system for a controller. The qualitative tuning system comprises means for converting input information to logic values. The tuning system also comprises an inference engine for determining adjustment to gain of the controller based on the logic values received from the converting means. The inference engine is connected to the converting means. The tuning system has means for converting the adjustment to the gain to gain output values which are other than logic values. The converting the adjustment means is connected to the inference engine.

The present invention pertains to a method for controlling a fume hood with a sash. The method comprises the steps of providing information concerning flow of air through the fume hood to a processor. Then, there is the step of manually inputting information concerning gain into a qualitative tuning system connected to the processor. Next, there is the step of automatically producing an adjustment to the gain to the processor by the qualitative tuning system based on the information. Then, there is the step of controlling the flow of air through the fume hood with the processor based on the gain it receives from the qualitative tuning system.

The present invention pertains to a method for qualitatively tuning a processor. The method comprises the steps of transforming information into an information signal relative to gain. Then, there is the step of converting the information signal about gain into a logic value signal. Next, there is the step of determining adjustments to gain signal based on the logic value signal. Then, there is the step of inputting the adjusted gain signal to the processor.

The present invention additionally pertains to a system for controlling a fume hood having a sash with a face. The system is comprised of means for controlling air flow through the fume hood based on sash position and air flow—face velocity. The system also is comprised of a controller, remote from the controlling means, but in communication with the controlling means.

Additionally, the present invention pertains to a system for controlling a fume hood having a sash and a face. The system is comprised of means for determining a desired face velocity. There is also a sash area sensor. Additionally, the system is comprised of a processor for controlling air flow through the fume hood based on the face velocity and the sash area.

The present invention also pertains to a method for controlling air flow through a fume hood having a sash with a face. The method comprises the steps of sensing velocity of air at the face of the fume hood. Then, there is the step of sensing sash position of the fume hood. Next, there is the step of controlling an air flow through the fume hood based on the velocity of air at the face of the fume hood and the sash position of the fume hood.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
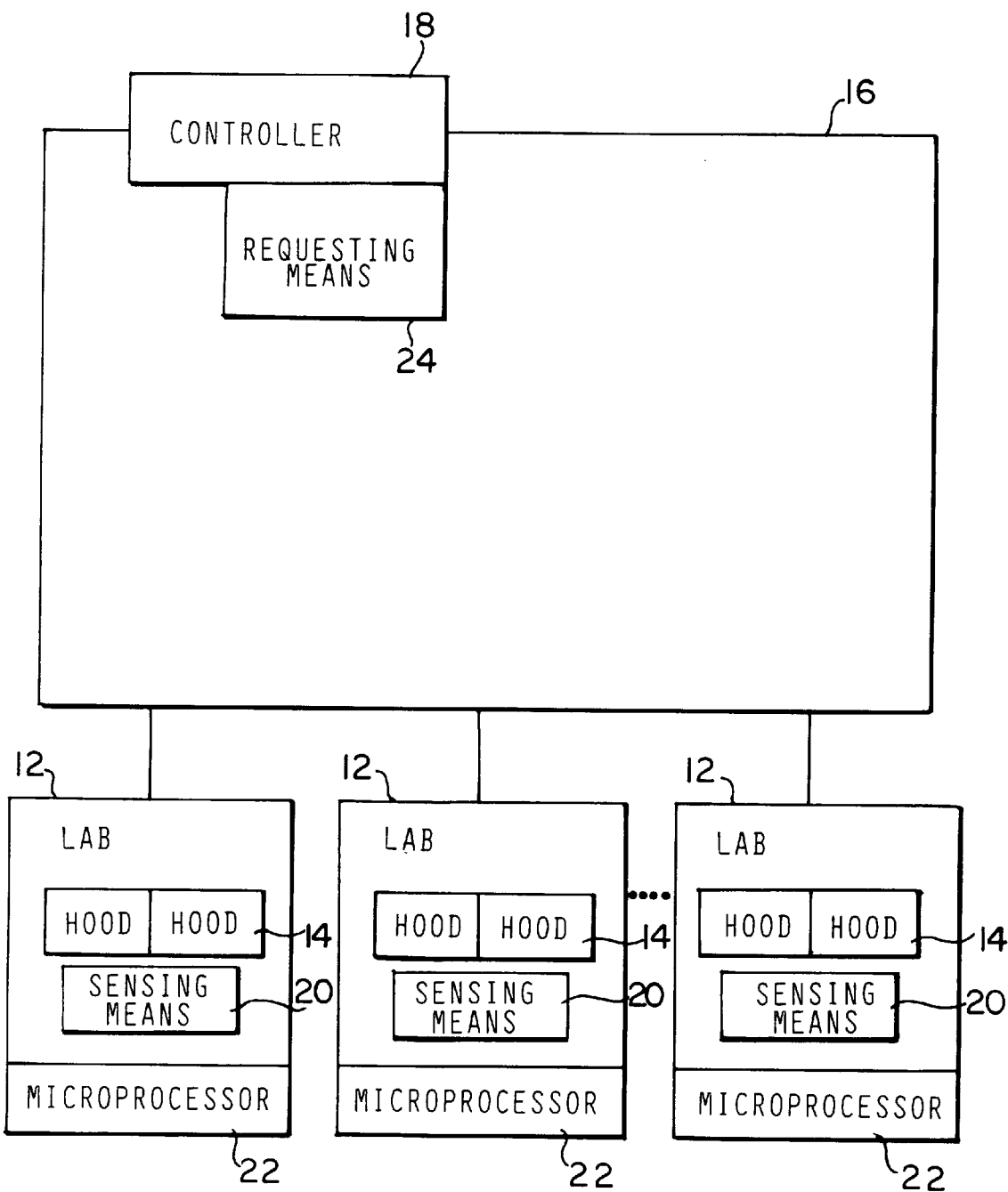
FIG. 1 is a schematic representation of a system for controlling laboratories having fume hoods.

Referring now to the drawings wherein like reference numerals refer to similar or identical parts throughout the several views, and more specifically to FIG. 1 thereof, there is shown a schematic representation of a system 10 for controlling laboratories 12 having fume hoods 14. The system 10 is comprised of a network 16 along which information is carried. Preferably, the network 16 operates in the half-duplex mode, for instance, with a two-wire RS485 network.

The system 10 is also comprised of a controller 18 in contact with the network 16 for receiving information from and providing information to the network 16. Preferably, the controller 18 includes means 24 for requesting information from each microprocessor 22 about its condition. Preferably, the requesting means 24 requests information from each microprocessor 22 one at a time.

Figure 2:
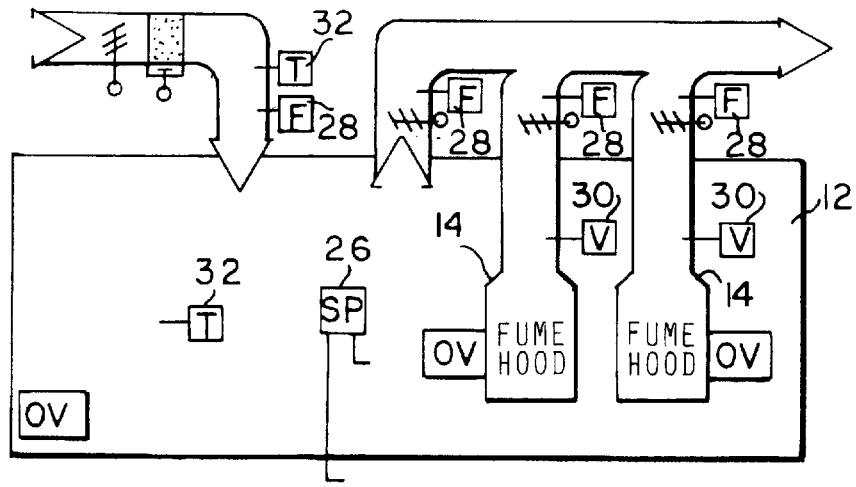
FIG. 2 is a schematic representation of a laboratory.

Additionally, the system 10 is comprised of means 20 for sensing a laboratory's 12 state. The state of the laboratory is defined as, at least, the static pressure and the supply/exhaust differential of the laboratory 22, and also the face velocity of the fume hood 14 in the laboratory. The sensing means 20 is disposed in each laboratory 12. The sensing means 20 preferably includes a static pressure sensor 26, a supply/exhaust differential sensor 28 and a face velocity sensor 30 disposed in each laboratory 12, as shown in FIG. 2. FIG. 2 is a schematic representation of the laboratory 12. There can also be included a temperature sensor 32.

There is also a microprocessor 22 disposed in each laboratory 12 for receiving information concerning the laboratory 12 from the respective sensing means 20 and the controller 18 in order to maintain the laboratory 12 at a predetermined state, and to provide information about the laboratory 12 to the controller 18. Preferably, the controller 18 and the microprocessors 22 maintain the respective laboratory 12 in the predetermined state by maintaining their respective static pressure and supply/exhaust differential as well as the face velocity of the hoods 14 of a given laboratory 12.

The controller 18 and microprocessors 22 preferably operate in a master slave relationship with the controller 18 being the master and the microprocessor 22 being the slave. The master initiates all communications by sending messages. Messages are composed, for instance, of data bytes transmitted serially using standard asynchronous data frames. These data frames can consist of one start bit, eight data bits, no parity bit, and one stop bit.

The master and each slave share the same network 16 for transmitting and receiving (half-duplex). The master and each slave must be able to enable/disable their transmitters (not shown), so as not to interfere with other slaves' transmissions. The transmitter enable/disable should be controlled such that the carrier enable is switched off concurrently with the end of the final stop bit of any transmission. The master arbitrates when a given slave may respond with the simple rule that a slave only transmits in response to a message uniquely directed to it. See PUP guidelines (A document entitled "PUP Protocol Guidelines" is available from American Auto-Matrix, Inc. Please contact the PUP Protocol Committee and request Version 6.) for an example of a protocol that can be used in the system.

Figure 3:
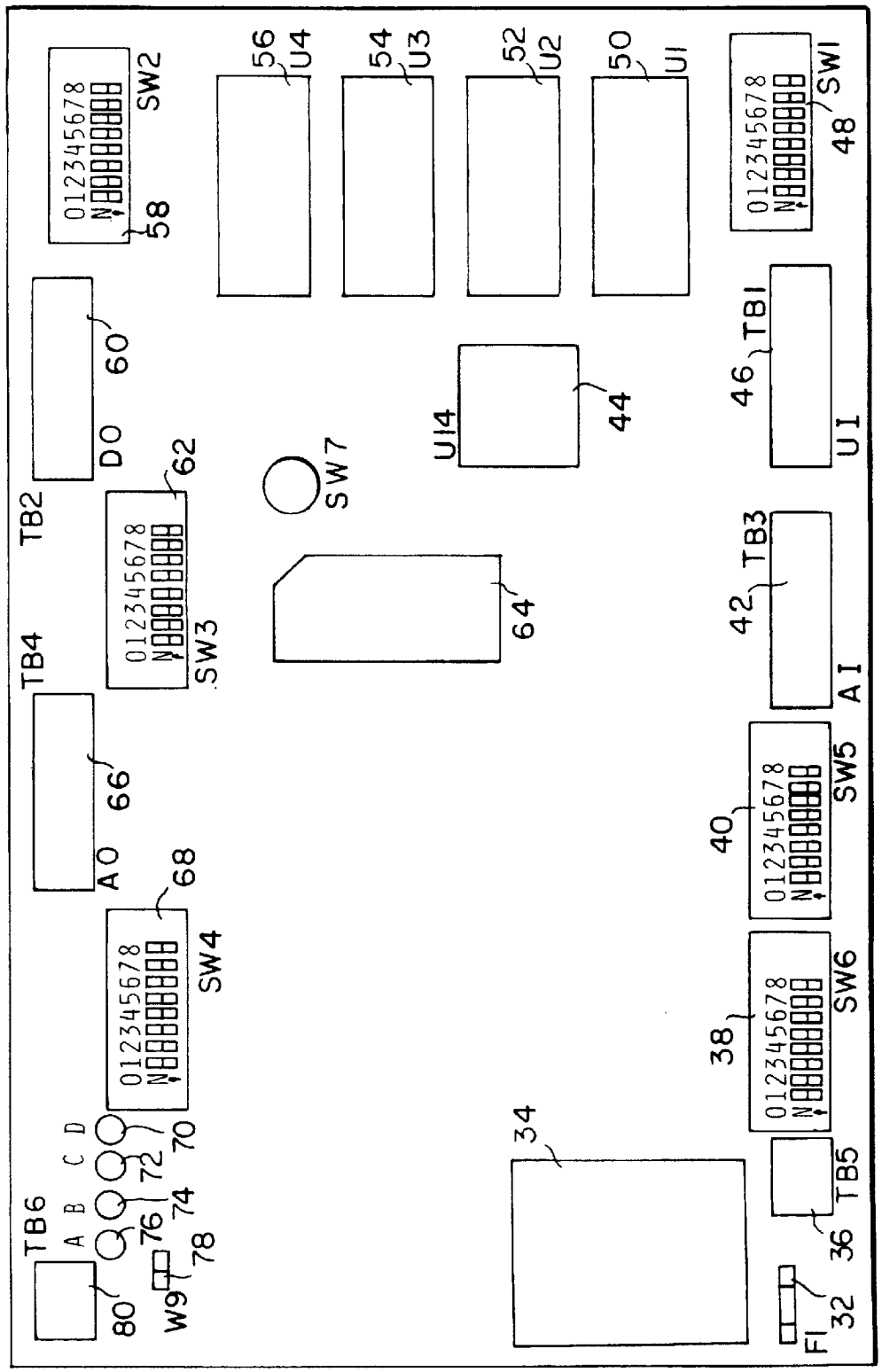
FIG. 3 is a schematic representation of a microprocessor.

In the operation of the preferred embodiment, a microprocessor 22 is disposed in each laboratory 12, as shown in FIG. 3. FIG. 3 is a schematic representation of the microprocessor 22. The microprocessor 22 is comprised of a fuse 32 which protects the microprocessor 22 from electrical overload. There is a transformer 34 for converting current and voltage provided to the microprocessor 22 through the power input port 36. There is a first switch block 38 with eight switches used to select thermistor support for eight analog inputs. When any given switch is on (moved to the right), it operates as a thermistor and when any given switch is off (moved to the left), the switch operates in a normal mode, as is well known in the art.

There is a second switch block 40 with eight switches used to select a current or voltage mode for analog inputs one through eight. When the switch is off, the voltage mode is utilized and when the switch is on, the current mode is utilized. There is an analog input port 42 which receives analog input wiring, i.e., high resolution (12-bit) input devices such as flow sensors, velocity sensors, the static pressure sensor, and the discharge air temperature sensor are hardwired (connected) to the analog input port 42 (TB3). A processor 44 processes the information received by the microprocessor from the network 16 and sensors in the laboratory 12 and also provides information concerning the respective laboratory 12 to the network 16. A universal input wiring input port 46 receives analog/digital input wiring, i.e., low resolution (8-bit) and digital input devices such as the room temperature sensor, sash position sensors, the humidity sensor, and the emergency contacts are hardwired to input port 46 (TB1). A third switch block 48 with eight switches is used to select thermistor support for the universal input port 46 inputs one through eight.

The memory for the microprocessor 22 includes an executive eprom 50, a nonvolatile ram 52, an application eprom 54 and an expansion eprom/ram 56. The executive eprom 50 contains the basic operating routines of the microprocessor. Input/output, communications, diagnostics, and initialization routines as well as the utility routines for the application which include but are not limited to the math functions and the PID control routines.

The non-volatile ram 52 is used for work space for the executive and the application as well as for storage of attributes and control parameters.

The application eprom 54 contains the laboratory/fume hood control algorithms.

The expansion eprom/ram 56 is used for extra application algorithm storage or for extra non-volatile ram storage. In the present SOLO/FX configuration, this site is unused.

There is a fourth switch block 58 with eight switches that can be used as determined for a given situation. The digital (binary) output port is used to connect devices to the microprocessor for annunciating alarm conditions and for general purpose digital outputs. A fifth switch block 62 with eight switches is used to select a current or a voltage mode for analog outputs five through eight of analog output port 66. There is a three-volt lithium smart battery 64 used to maintain the data in the ram 52 in the event of a power failure. There is a sixth switch block 56 that has eight switches that are used for analog outputs one through four of analog output port 66 to determine whether they should be in a current or voltage mode.

A first led 70 indicates whether the application eprom 54 is installed in the microprocessor 22. If the led 70 is off, it indicates that the application eprom 54 is installed in the microprocessor 22. A second led 72, when flashing, indicates that the microprocessor 22 is operating properly. A third led 74, when on, indicates that the microprocessor 22 is transmitting data to the controller 18. A fourth led 76 indicates when the microprocessor 22 is receiving data.

There is a jumper block 78 with two pins. When the jumper block 78 is installed, a termination resister is positioned for the RS485 network 16. The microprocessor 22 connects to the network 16 through the network connection port 80.

Figure 5:
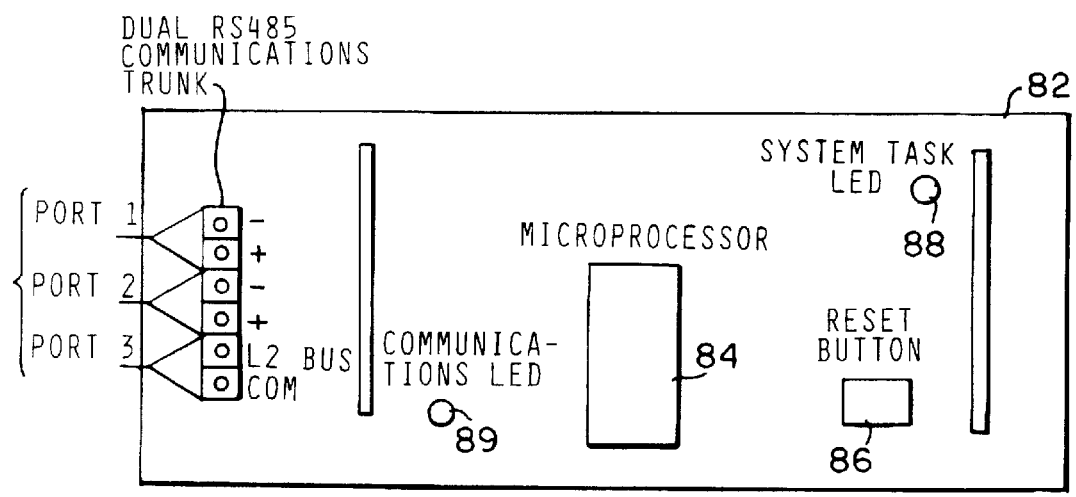
FIG. 5 is a schematic representation of a module.
Figure 4:
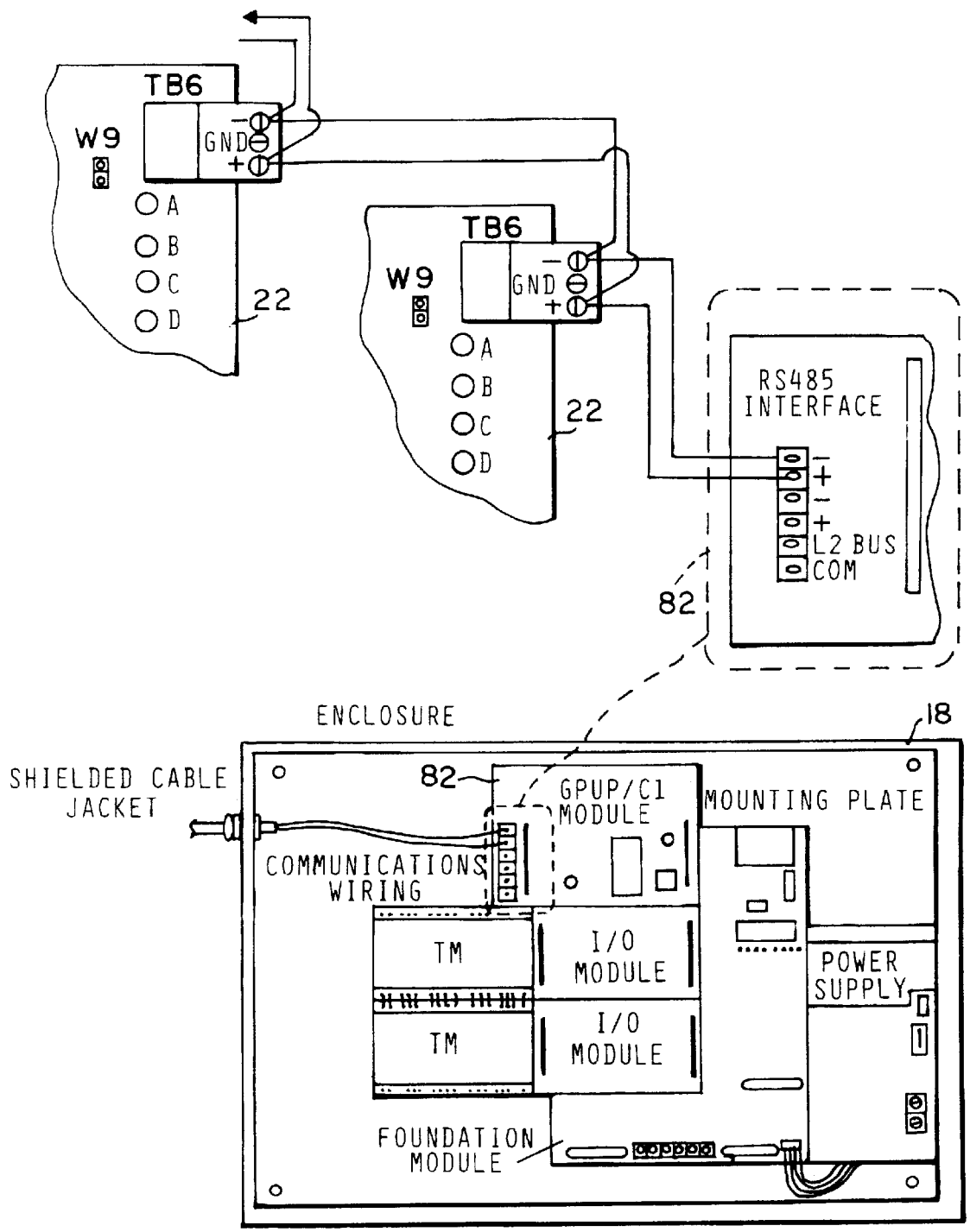
FIG. 4 is a schematic representation of the network configuration.

The controller 18, as shown in FIG. 4 which is a schematic representation of the network configuration, includes a module 82. FIG. 5 shows a module 82 and is a schematic representation of the module 82. The module 82 includes a module processor 84 for providing the proper instructions to the various laboratory 12 microprocessor 22 via the network 16, as well as for receiving information to better maintain the overall system 10 from the various microprocessors 22 and the laboratories 12. The module 82 also includes a reset button 86, a system task led 88 and a communications led 89. The reset button 86 is used to reset the communication module 82 without resetting the entire STAR controller 18. The system task LED 88 is lit to indicate that the communication module 82 task is currently being serviced. The communication LED 89 is lit when the communication module 82 is idle, i.e. not transmitting. There are also ports 90 which connect the module 82 to the dual RS45 communications network 16. In general, for the preferred embodiment, the inputs and outputs are the following:

| Analog Inputs | |
| --- | --- |
| AI1 | Space Static Pressure |
| AI2 | Supply Air Flow |

-continued

| | |
| --- | --- |
| AI3 | Exhaust Air Flow |
| AI4 | Hood A Air Flow |
| AI5 | Hood B Air Flow |
| AI6 | Hood A Face Velocity |
| AI7 | Hood B Face Velocity |
| AI8 | Discharge Air Temperature |
| Universal Inputs | |
| UI1 | Room Temperature - 8-bit Analog |
| UI2 | Hood A Sash Area - 8-bit Analog |
| UI3 | Hood B Sash Area - 8-bit Analog |
| UI4 | External Supply Damper/Humidity Input- 8-bit Analog |
| UI5 | External Exhaust Flow Input - 8-bit Analog |
| UI6 | Space Emergency Contact - Digital |
| UI7 | Hood A Emergency Contact - Digital |
| UI8 | Hood B Emergency Contact - Digital |
| Analog Outputs | |
| AO1 | Supply Damper Position |
| AO2 | Reheat Valve Position |
| AO3 | Exhaust Damper Position |
| AO4 | Hood A Damper Position |
| AO5 | Hood B Damper Position |
| AO6 | Auxiliary Reheat Valve Position |
| AO7 | Total Exhaust Air Flow |
| AO8 | Humidity Cooling Valve Position |
| Digital Outputs | |
| DO1 | Space Emergency Output |
| DO2 | Hood A Emergency Output |
| DO3 | Hood B Emergency Output |
| DO4 | High Limit Output |
| DO5 | Low Limit Output |
| DO6 | Digital Output 6 - Unused |
| DO7 | Digital Output 7 - Unused |
| DO8 | Digital Output 8 - Unused |

A given module can be networked with up to 32 microprocessors 22 in series as shown in FIG. 4. The module 82 can be integrated into a STAR which serves as the controller 18. The STAR is a microprocessor based, multitasking field panel for monitoring and controlling devices which include the communication module 82. More information can be found in a document entitled "STAR User Manual" American Auto-Matrix part number 1E-04-00-0054.

Figure 6A:
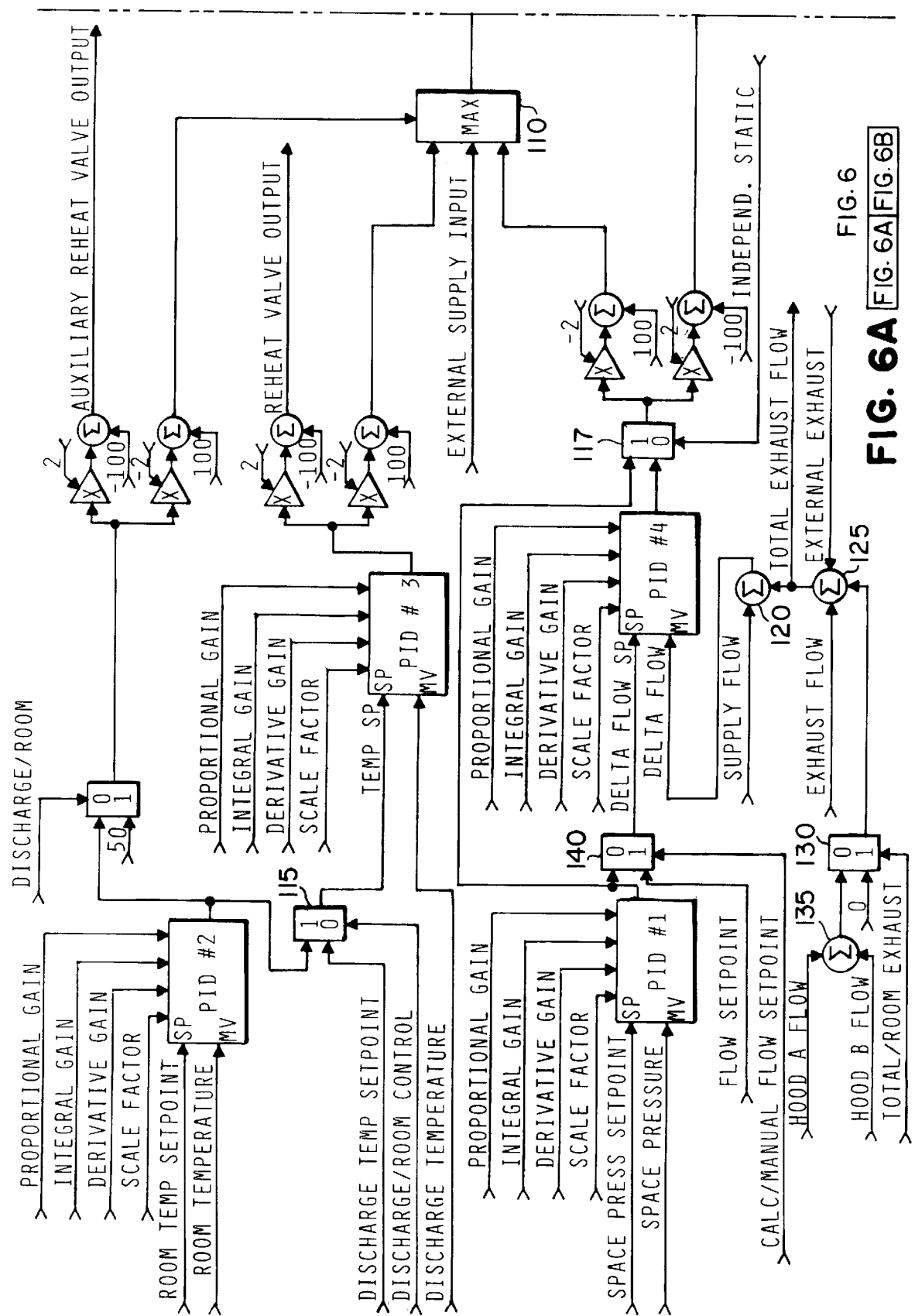
FIG. 6 is a schematic representation of the laboratory control circuit.
Figure 6B:
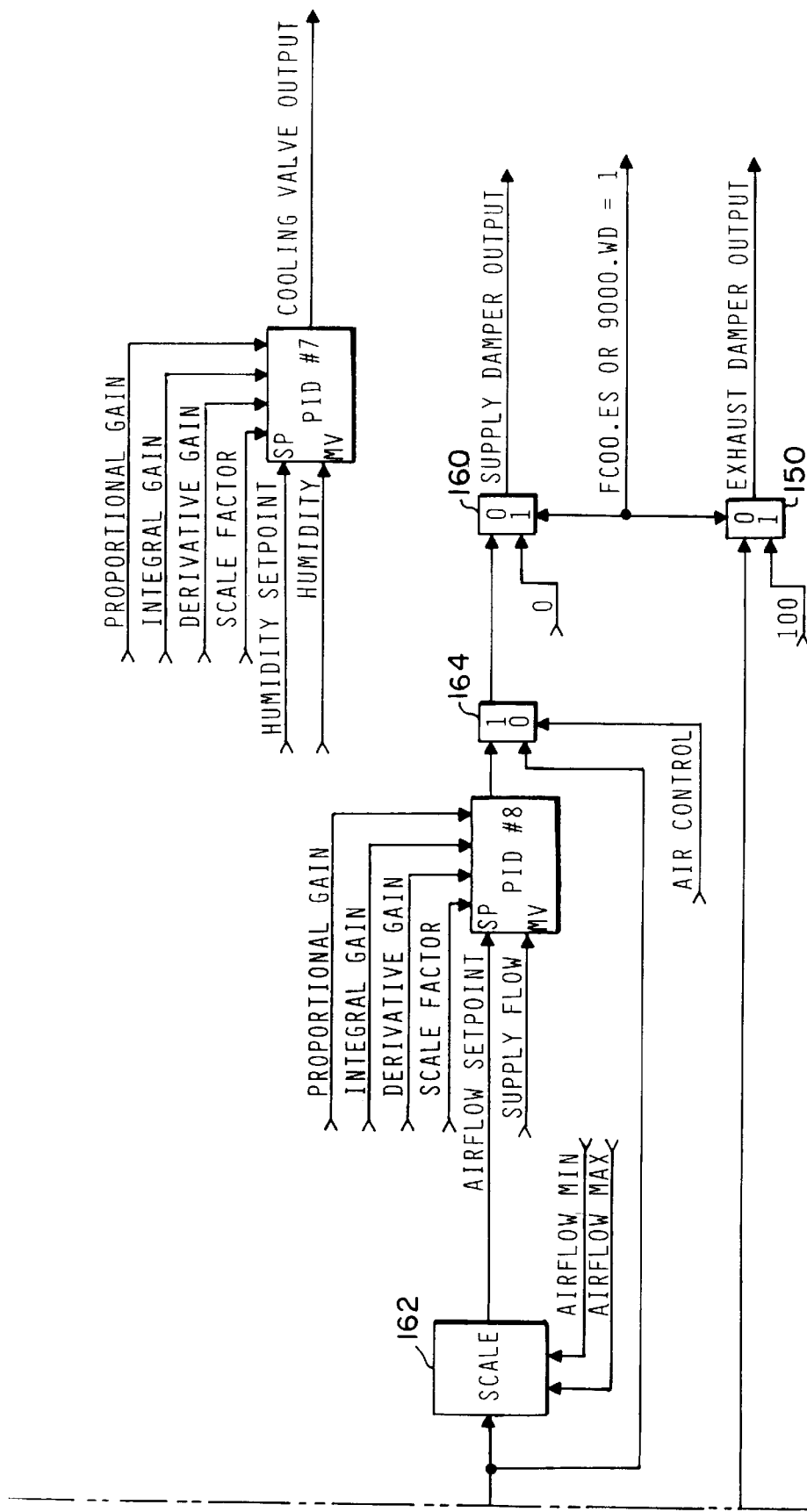

A laboratory is controlled by, for instance, the laboratory control circuit 100 as shown in FIG. 6. A discussion of its control sequence follows. There are preferably four elements of the control sequence. These are temperature, static pressure, humidity and delta flow with respect to a room under the control of the laboratory controller 100. The four variables that can be manipulated in order to obtain the desired temperature, static pressure, humidity and delta flow is a supply damper, which controls the amount of air flow into the room; an exhaust damper, which controls the amount of air flow out of the room; a cooling valve which dehumidifies the air; and the reheat valve, which controls the amount of heat provided to the flow of air that passes through the supply damper into the room.

Specifically, the control sequence with respect to the control of temperature in the room preferably has two possible procedures that can be used to introduce additional heat, less heat or the same amount of heat into the room. The first procedure utilizes a temperature sensor 32 which determines the room temperature and provides a corresponding signal to the measured variable (MV) input of PID No. 2, as shown in FIG. 6. PID No. 2 also receives in its set point (SP) input a room temperature set point signal which corresponds to a desired room temperature.

The PID No. 2 provides an error signal corresponding to the difference between the room temperature and the room temperature set point. This error signal provided by PID No. 2 is then used as the temperature set point input which is provided to the SP input of the PID No. 3. The PID No. 3 also receives a discharge temperature signal through its MV input which corresponds to the temperature of the air entering the room through the supply damper. PID No. 3 then provides an error signal that corresponds to the error between the discharge temperature and the temperature set point. This error signal from PID No. 3 is then used to control the reheat valve. The output of PID No. 2 can optionally be used to control an auxiliary reheat valve if one is present in the room.

The control of the reheat valve can be better understood with the following examples. If the error signal, for instance, from PID No. 3 indicates that the discharge temperature is not yet hot enough to obtain a desired temperature in the room, then the reheat valve will open further to allow additional heat to be supplied to the air flow passing into the room through the supply damper. If the error signal from PID No. 3 is, for instance, too high, then the reheat valve is caused to allow less heat to be provided to the flow of air into the room through the supply damper. The error signal from PID No. 3 is also provided to a maximum switch 10 which is involved with the control of the supply damper. The control of the supply damper will be discussed below.

The second procedure that can be used to control temperature is for the temperature set point to be manually inputted into the SP input of PID No. 3. This is done by toggling a switch 15 disposed between the PID No. 2 and PID No. 3 of the lab control diagram such that its 1 input passes the manual temperature set point signal (as opposed to the 0 input of the switch 15 with respect to the first procedure which passes the error signal from PID No. 2). By choosing the manual temperature set point input, the signal provided by PID No. 2 is eliminated and a fixed temperature set point is then provided to the PID No. 3. The subsequent operation of the second procedure for controlling temperature in the room is the same as the operation of the first procedure described above for controlling the temperature starting from PID No. 3.

In order to control the static pressure and the delta flow in the room, a space pressure set point signal is provided to input SP of PID No. 1. The actual space pressure is provided to input MV of PID No. 1. An error signal corresponding to the difference in these signals is then produced from PID No. 1 and is the delta flow set point signal provided to input SP of PID No. 4. (Recall that static pressure and delta flow are related since static pressure is constant when delta flow is zero; and static pressure is changing in the direction of increasing or decreasing delta flow when delta flow is changing). Thus, PID No. 1 provides the delta flow set point that corresponds to the difference between the actual static pressure in the room and the desired static pressure in the room. If the actual static pressure is the desired static pressure, then the delta flow set point signal is essentially zero. If the actual static pressure is different than the desired static pressure, then the delta flow set point signal corresponds to this difference. The actual delta flow signal in the room is provided to the MV input of PID No. 4. Optionally, PID No. 1 can be used to directly control the supply and exhaust (static pressure) in a room without utilizing flow sensors by way of switch 117.

PID No. 4 produces an error signal corresponding to the difference in the delta flow set point signal and the actual delta flow signal. This error signal from PID No. 4 is then provided to the exhaust damper output. The exhaust damper is accordingly moved in response to the command placed on it from the signal of PID No. 4. The error signal from PID No. 4 is also provided to the maximum switch 10 to which the error signal PID No. 3 is also provided.

The maximum switch 10 allows the greatest of four signals (auxiliary reheat, reheat, static pressure and external supply) to pass to the supply damper output. It is the greatest of these four signals which controls the supply damper. This way, for instance, if more heat is to be provided to the room in order to increase the temperature of the room, then the supply damper will also increase the flow of heated air into the room. If, the signal from PID No. 4 is greatest than the signal from PID No. 3 due to, for instance, the static pressure, or the delta flow being increased, then the supply damper will provide a greater flow of air to the room in order to increase the static pressure or the delta flow.

With respect to the delta flow signal provided to the MV input of PID No. 4, the signal is essentially the difference between the supply flow into the room and the exhaust flow out of the room. The exhaust flow out of the room is determined one of two ways. In the event that a sensor determines the overall exhaust flow from a room, then this value is subtracted from the supply flow into the room at subtractor 120 to yield the delta flow of the room. If the exhaust flow sensor is disposed such that it only determines exhaust flow out of the room but does not determine the exhaust flow out of the room from a hood A and a hood B, then the total exhaust flow is determined by adding the exhaust flow out of the room plus the addition of the exhaust flow out of hood A and hood B at summer 125. The aforementioned is reduced to practice in part with a switch 130 toggled to allow the appropriate signal to pass. If the sensor determines the overall flow out of a room, then the switch 130 is toggled to allow a zero input signal to pass through the 1 input of the switch 130. If the exhaust sensor is disposed such that only the exhaust of the room less the exhaust out of hood A and hood B is sensed, then the switch 130 is toggled such that the sum of the exhaust out of hood A and hood B (accomplished with summer 135) is passed through the input of the switch 130 to be added at summer 125 to the exhaust flow from the room.

Alternatively, the delta flow set point signal can be manually set by toggling a switch 140 between PID No. 1 and PID No. 4 to only allow a manual flow set point signal to pass through the switches input (as opposed to allowing the delta flow set point signal of PID No. 1 to pass through the input of the switch 140).

In the event it is desired to manually control the exhaust damper and the supply damper such that they are fully open or fully shut, respectively, by properly toggling switch 150 and switch 160, respectively, a 100% open or 0% open signal, respectively, is provided to the switches 1 inputs and is passed therethrough to open or close the exhaust and supply dampers, respectively. In this manner, the room can be quickly depleted of air, if, for instance, a fire or toxic chemical release occurs. If the switch 50 and switch 60 is toggled such that the signal at their 0 inputs are passed therethrough, then the signals from PID No. 4 or from the maximum switch 10 is passed to the exhaust or supply damper, respectively.

Optionally, to maintain a minimum air flow into a room, which provides for a minimum number of air changes for a given time (per hour) in a room, the output signal from switch 110 is received by both scaler 162 and switch 164 (if it is desired not to maintain a minimum air flow, then switch 164 is set to 0 and the output from switch 110 passes directly to switch 160). Scaler 162 receives a minimum and maximum air flow range. Scaler 152 then scales the output signal from switch 110 to be in an allowable air flow range. The output signal from scaler 162 is then provided to the SP input of PID No. 8. The MV input of PID No. 8 receives a supply flow signal indicating the supply flowing through the supply damper and outputs a signal to switch 164 when is then provided to the supply damper.

The humidity control is accomplished by PID No. 7 receiving through MV input the humidity sensed by a humidity sensor in the room. The humidity set point is predetermined and provided to the SP input. The output of PID No. 7 controls a cooling valve based on the level of humidity in the room. If the humidity is too high, then the cooling valve is open further. This causes the room temperature to drop thus causing the humidity in the room to drop.

The control sequence with respect to the flow of air through a hood 14 is based on, in general, coordinating the sash area of the hood 14 with the hood exhaust damper opening. When the sash area is increased, the damper opening is also increased in order to remove the additional volume of air that is provided to the hood (because of the increased sash area) and thus maintain the desired face velocity. When the sash area is decreased, the damper opening is also decreased in order to prevent the smaller volume of air through the smaller sash area from being drawn too quickly through the damper opening. Consequently, the desired face velocity is again maintained.

Figure 8:
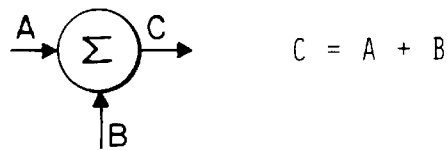
FIG. 8 is a key, with respect to elements of FIGS. 6 and 7, defining them.
Figure 8:
Figure 8:
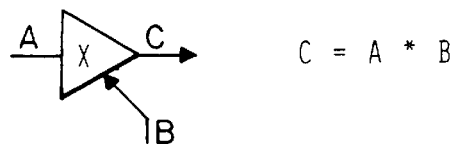
Figure 8:
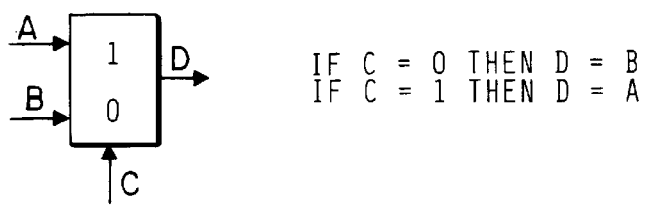
Figure 8:
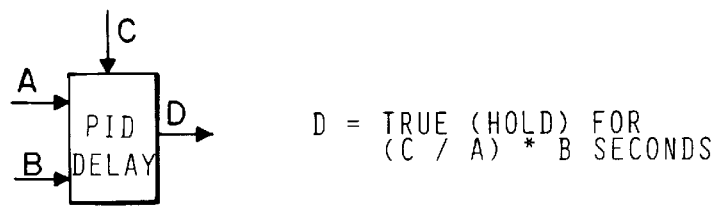
Figure 8:
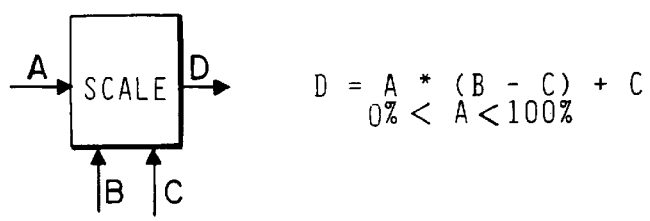
Figure 8:
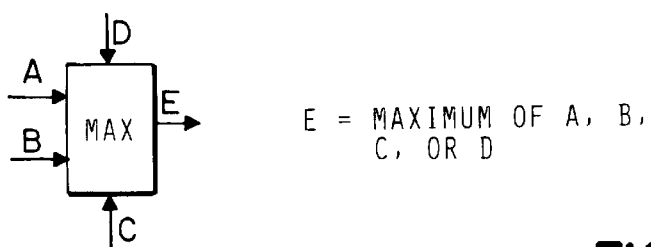

The control sequence provides for control of either face velocity for velocity control, or face velocity multiplied by sash area for flow control (see FIG. 8). If face velocity is chosen as the basis for measurement, then the one input of switch 200 receives the velocity signal corresponding to the face velocity of the hood. This face velocity signal is passed through switch 200 to the MV input of PID No. 5 and PID No. 6 (PID No. 5 controls a first hood and PID No. 6 controls a second hood). Additionally, through switch 210's one input is received a face velocity set point signal which is then passed through switch 210 to the set point SP input PID No. 5 and PID No. 6. The face velocity signal received at input SP and an error correction signal is outputted from PID No. 5 and PID No. 6 and provided to switch 220. If switch 220 is not toggled to an override position, then the signal outputted from PID No. 5 and PID No. 6 is then passed directly to the exhaust damper of the hood positioning it to be in a desired location. In the event that the override mode is toggled on switch 210, then the output signal from switch 220 causes the exhaust damper to take a fully opened position and allow the maximum possible exhaust to be obtained.

Alternatively, if the flow control is used as a basis to maintain the exhaust damper, then the 0 input of switch 200 receives the sensed flow through the exhaust. This signal is then passed directly through switch 200 to the MV input of PID No. 5 and PID No. 6. Switch 210 passes through the signal at its 0 input. This signal is the sash area of the hood multiplied by the face velocity set point. This resulting signal is provided to the SP input of the PID No. 5 and PID No. 6.

The set point signal provided by multiplying the face velocity set point by the sash area is additionally fed to a PID delay 230 as well as to a multiplier 240. At the multiplier 240, the signal is multiplied by a feedforward gain that provides a course adjustment signal which is received by summer 250. Summer 250 adds the course adjustment signal from multiplier 240 to a feedforward offset signal. This summed signal is provided to switch 260.

If the velocity mode is toggled, then a 0 output from switch 260 is provided to the PID No. 5 and PID No. 6. If the sash mode is chosen, then the signal received from summer 250 is passed to the FF input of PID No. 5 and PID No. 6. The feedforward offset signal is based on the parameters of the system such as the duct configuration and hood size. The ultimate purpose of the feedforward gain and feedforward offset being provided to the set point signal in the sash mode is to allow the exhaust damper to properly compensate for the situation where the sash area and thus the damper is suddenly changed. The exhaust damper lags in time in terms of how it compensates for this change in sash area. In order to eliminate or minimize the offshoot that the exhaust damper experiences from the sudden change in the sash area, the signal received by input FF causes the exhaust damper to move to the desired course position. The PID No. 5 and PID No. 6 utilizing the inputs from input MV and input SP then places the exhaust damper in an essentially fine adjustment until it arrives at a desired position.

The set point signal, arrived at by multiplying the face velocity set point time to sash area in the sash mode is also provided to PID delay 230. The PID delay 230 produces a signal based on the time it takes the damper to achieve full actuation (provided through the damper delay input to the PID and based on the maximum flow through the damper when it is fully opened). This delay signal is provided to switch 270 which, if the sash mode is being utilized, is then provided directly to the hold input of PID No. 5 and PID No. 6. The signal received at the hold input prevents the PID No. 5 and PID No. 6 from calculating the fine adjustment of the exhaust damper for a period of time determined by the signal provided at the hold input until the course adjustment has had time to reposition the exhaust damper. After the time period has passed, then the fine tuning of the exhaust damper position is allowed to continue using the MV input and SP input of PID No. 5 and PID No. 6.

The control sequence provides for control of either face velocity for velocity control or face velocity multiplied by sash area for flow control.

Accordingly, at least the following features are provided:
1. Fume hood air velocity control for safety of the operator and/or integrity of the experiment/process.
2. Control of room pressure to maintain safety or to prevent contamination.
3. Control of room temperature and humidity for comfort and for process requirements.
4. Integration of velocity, pressure and climate control with a direct digital control system.

The sash area of a fume hood is calculated from a formula which permits several methods of measurement which derive their input from a universal input connected to some type of sensor, usually a multi-turn potentiometer connected to a drum or pulley which is directly attached to the sash. The formula takes into account several parameters which can be programmed by the user to model the specific fume hood and sash system.

The formula used for calculating the sash position is shown in the following equation:

$$\text{Area} = OA + [GA * PI * SR * (UI/255) * [SD + ST + SR * (UI/255)]/12]$$

Where:
  OA Offset Area—minimum sash opening, SQ FT
  GA Sash Width—width of sash opening, FT
  SR Pot Turns Per 100%—number of turns the post has from endstop to endstop UI Universal Input—8-bit analog input which measures the pot voltage PI Pi—3.1416

SD Drum Diameter—diameter of drum or pulley to which the pot is attached, IN

ST Cable Thickness—thickness of the cable used if the pot is attached to a drum which coils the cable, IN This equation accounts for the added diameter of the drum caused by the coiled cable. In the case of a system with a pot connected directly to a pulley, the ST, cable thickness, attribute would be set to zero and the drum diameter would simply be SD.

Figure 9:
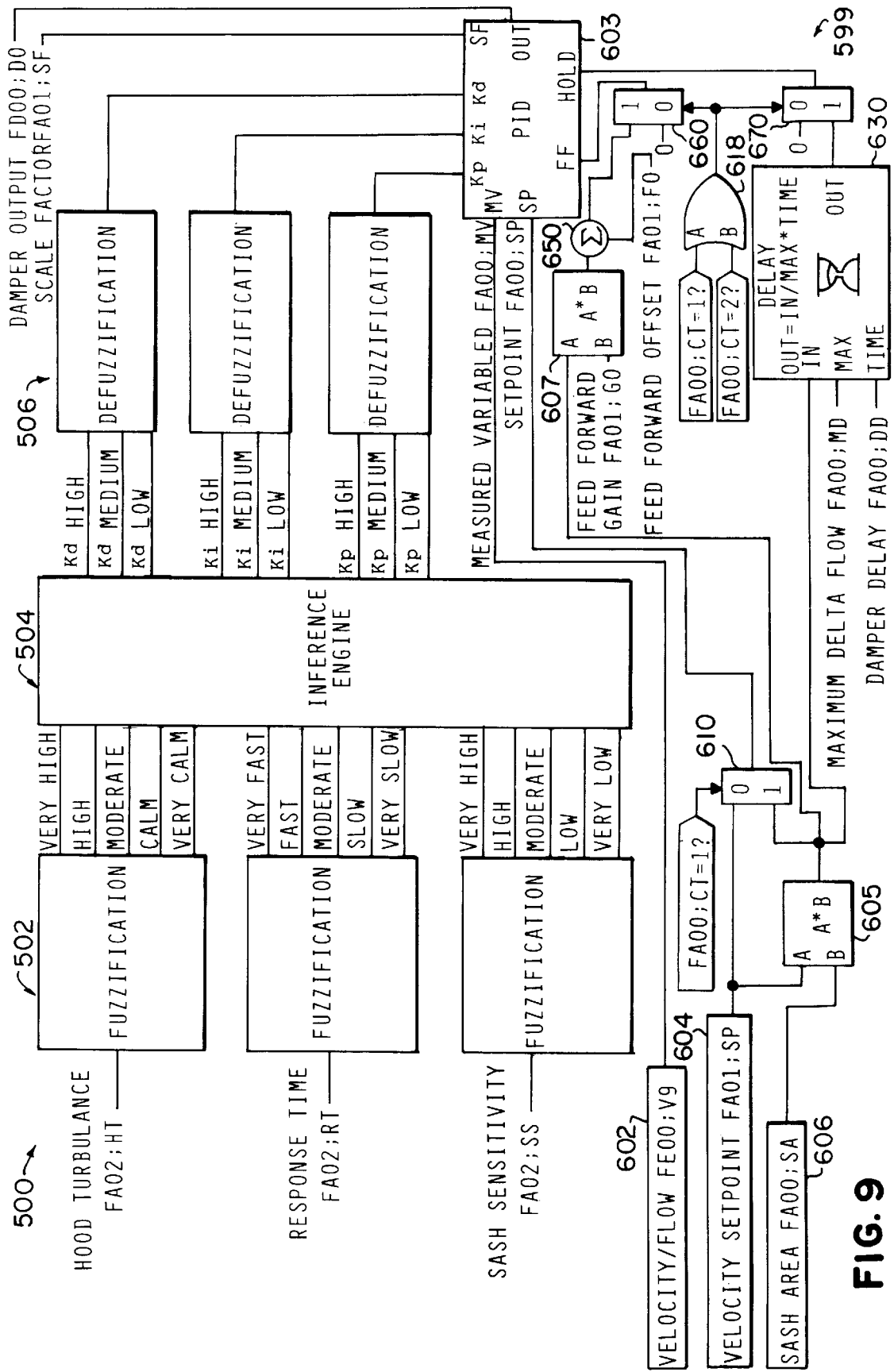
FIG. 9 is a schematic representation of another embodiment of a hood control circuit.
Figure 18:
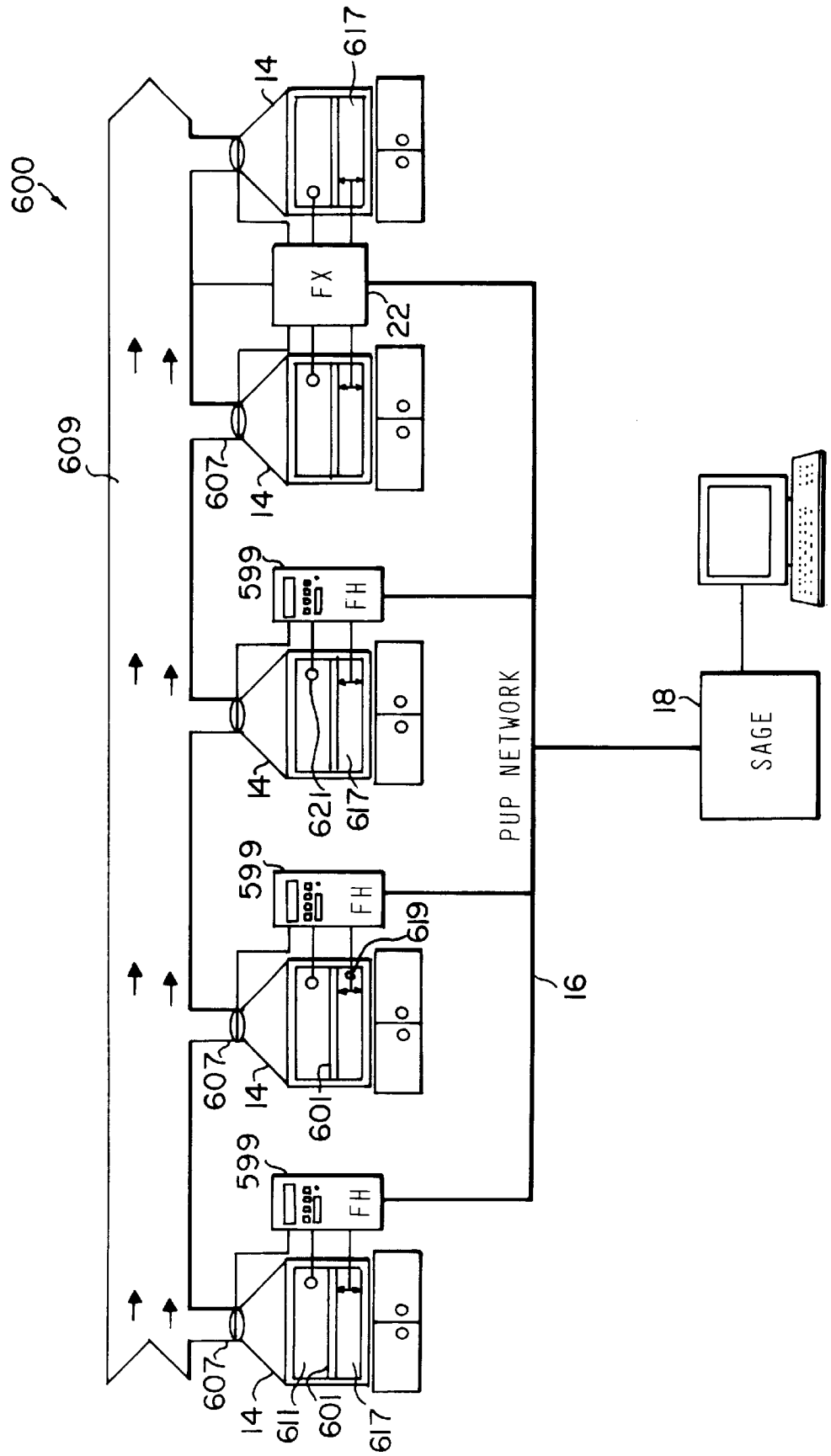
FIG. 18 is a schematic representation of a network with a controller and a system of the present invention in conjunction with fume hoods.

In an alternative preferred embodiment, the present invention pertains to a system 599 for maintaining a desired air flow through a fume hood 14 having a sash 601 and a face 611, as shown in FIGS. 9 and 18. The system 599 comprises a processor, such as a PID 603, for controlling air flow through the fume hood 14 based on at least one gain. The system 599 also is comprised of means 500 for automatically tuning the gain connected to the controlling means. Additionally, the system 599 is comprised of means for manually inputting information to the tuning means 500 so the tuning means 500 automatically provides a desired gain to the PID 603 based on information received from the inputting means.

Figure 10:
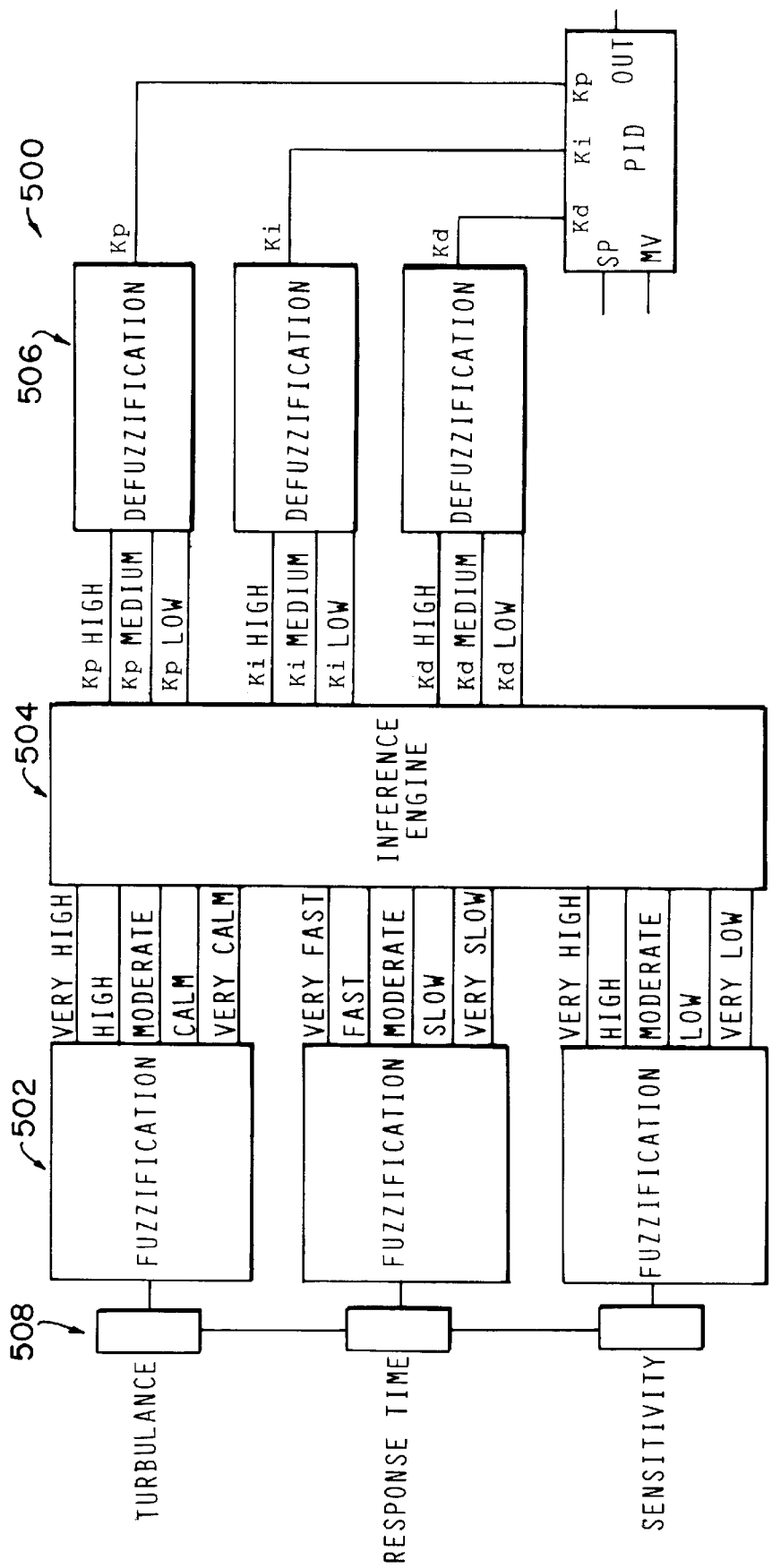
FIG. 10 is a block diagram of a qualitative tuning system.

The tuning means 500 preferably includes means 502 for converting input information to logic values, as shown in FIG. 10, and the manually inputting means is a keypad 508 in which crisp input values (other than logic values) are entered into the converting means 502. Preferably, the converting means 502 is comprised of at least one input membership function which defines a number of domains within a range of input variables.

The tuning means 502 preferably also includes an inference engine 504 for determining an adjustment to the gain based on the logic values received from the converting means 502. The inference engine 504 is connected to the converting means 502. The inference engine 504 is preferably comprised of a set of rules describing the desired system behavior. The inference engine applies the logic values from the converting means 502 to the set of rules to produce an adjustment to the gain. The adjustment to the gain is preferably a logic value.

The tuning means 500 preferably also includes means 506 for converting the adjustment to the gain to gain output values which are other than logic values. The converting the adjustment means 506 preferably comprises at least one output membership function which defines a number of domains within the range of the output variable. With the output membership function, the logic value received from the inference engine 504 is converted to a crisp output value that can be transmitted to the controlling means. The converting the adjustment to gain means 506 is connected to the inference engine 504.

The present invention also pertains to a method for controlling a fume hood 14 with a sash 601 and a face 611. The method comprises the steps of providing information concerning flow of air through the fume hood 14 to a processor, such as a PID 603. Then, there is the step of manually inputting information concerning gain into a qualitative tuning system 500 connected to the PID 603. Next, there is the step of automatically providing an adjustment to the gain to the PID 603 by the qualitative tuning system 500 based on the information. Next, there is the step of controlling the flow of air through the fume hood 14 with the PID 603 based on the gain it receives from the qualitative tuning system 500. The method for qualitatively tuning a processor preferably comprises the steps of transforming information into an information signal relative to gain. Next, there is the step of converting the information signal about gain into a logic value signal. Then, there is the step of determining adjustments to a gain signal based on the logic value signal. Then, there is the step of inputting the adjustment gain signal to the processor.

In the operation of the preferred embodiment, a system, such as a microprocessor 599, controls a single fume hood 14 based on face velocity, face velocity with sash position-feedforward, or flow reset by sash position. The hood's control parameters are programmable. The microprocessor 599 modulates a damper 607 located in the exhaust ductwork 609 to maintain a specified face velocity setpoint. A sash position sensor 619 can be used to anticipate changes in the face velocity due to sash movement. When control is based on exhaust flow, the sash position and desired velocity are used to calculate a corresponding flow setpoint.

The damper modulation is based on an analog output signal. The output signal is selectable for 0–10 VDC, 0–20 mA or 4–20 mA. Non-linear actuators are supported through programmable piece-wise linearization tables.

Piece-wise linearization tables for the Sierra Instruments 0–200 fpm and 0–2000 fpm velocity sensors 621 are provided. Two programmable linearization tables are available for other types of sensors.

A cascaded flow input is used to pass the exhaust flow from the microprocessor 599 to another microprocessor 599 for total exhaust tracking and control. When connected in this manner, the flow sensor input value is added to the cascaded flow input value. The result is then written to the cascaded flow output. A group of the microprocessors 599 can be connected to, for instance, a microprocessor 22, to handle the air flow tracking control.

An emergency override input forces the damper 607 to a programmable emergency position and initiates an alarm condition. One relay output is provided for alarming. In addition, three non-relay digital outputs can be programmed for various alarm functions. The apparatus supports PUP alarming (see PUP guidelines identified above), which operates in one of two ways. First, the microprocessor 599 will respond to any poll for alarms from a controller 18 or a monitoring device, such as an American Auto-Matrix SAGE™, SOLOFone™, MouseView™, SOLOView™ or SOLOTool™, as shown in FIG. 18. Second, the microprocessor 599 broadcasts its alarms when it has the token in a PUP token passing network. The desired alarm function is programmable.

Figure 11:
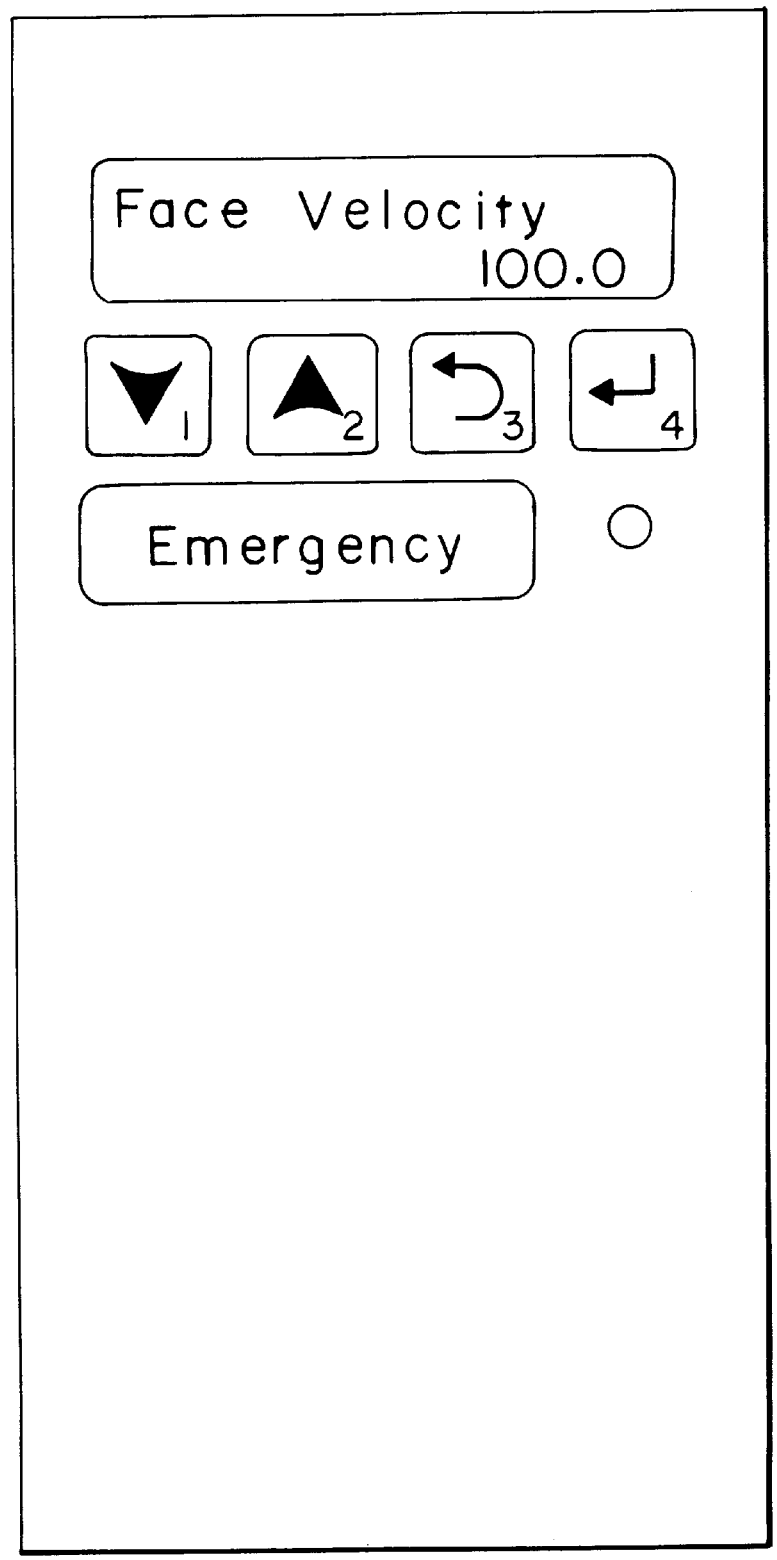
FIG. 11 is a schematic representation of a keypad.

The microprocessor 599 contains an integral keypad 503 and display, as shown in FIG. 11, for input monitoring and parameter modification. The operator interface is menu driven with password access and English language text, although other languages can be used.

The display is a backlit 2 line by 16 column LCD. The operator interface program provides simple English language menus. The menu structure allows parameters of the microprocessor 599 and other similar devices, such as SOLO products of American Auto-Matrix to be examined interactively and modified or adjusted. The microprocessor's 599 configuration and setup can also be examined and modified. All modification and examination functions may be configured to require one of several password codes, which are also configurable.

The microprocessor 599 may be used to examine parameters in any other SOLO based devices connected to the PUP network 16. The microprocessor 599 supports PUP version 8 display list conventions and attribute text descriptions.

A Bicolor LED displays summary status, where green indicates OK, yellow indicates low hood flow and red indicates emergency or extreme limit. The LED may be configured to flash when red or yellow to assist color blind operators.

The Qualitative Tuning System 500, as shown in FIG. 10, applies a Fuzzy Logic approach to assist in tuning the gains of standard PID 603 control loops. The tuning is achieved by adjusting qualitative parameters which are inputs to the system 500. These inputs are "fuzzified" and become inputs to the Inference Engine 504. Using these inputs, the Inference Engine 504 evaluates a set of rules which describe the behavior of the system. The outputs from the Inference Engine 504 are defuzzified and applied to the proportional, integral and derivative gains of the PID 603 control loop.

Figure 12:
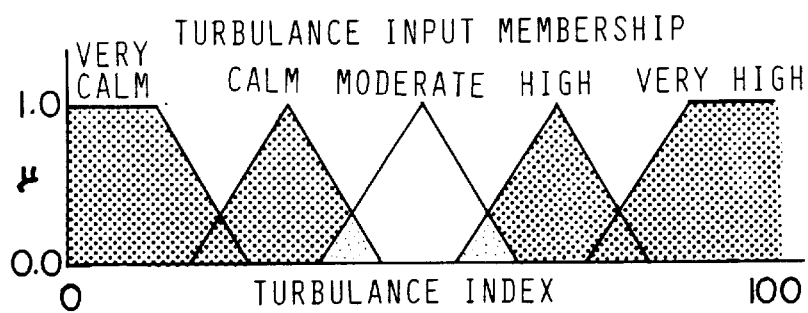
FIG. 12 is a graph of a turbulence input membership function.
Figure 13:
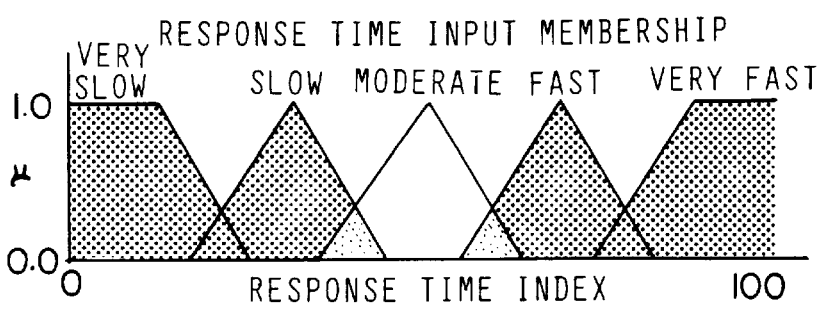
FIG. 13 is a graph of a response time input membership function.
Figure 14:
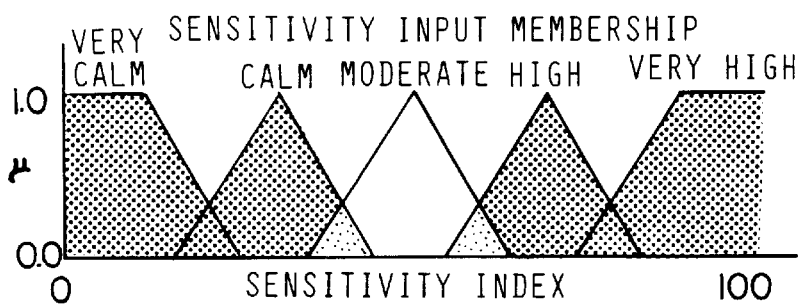
FIG. 14 is a graph of a sensitivity input membership function.

The tuning parameters must be converted from crisp input values to fuzzy logic values. The fuzzification process is achieved through input membership functions, which define a number of domains within the range of the input variable (universe of discourse). For example, the input parameter and input membership functions for turbulence, response time and sensitivity, as shown in FIGS. 12, 13 and 14, respectively, were chosen for the qualitative tuning system 500.

The Inference Engine 504 applies the fuzzy logic inputs from the fuzzification process to a set of rules describing the desired system behavior. These rules produce fuzzy output values. The inference engine evaluates the rules using the Min-Max method of rule evaluation. All rules are of the form:

IF Antecedent 1 AND Antecedent 2 Then Consequent 1

Antecedent takes the form: Input Variable=Label

Consequent take the form: Output Variable=Label

The qualitative system uses, as an example, the following rules to produce adjustments (outputs) for the proportional, integral and derivative gains.

Proportional (Kp) output rules

IF turbulence is calm AND response time is slow THEN proportional is low

IF turbulence is calm AND response time is moderate THEN proportional is low

IF turbulence is calm AND response time is fast THEN proportional is medium

IF turbulence is moderate AND response time is slow THEN proportional is low

Figure 15:
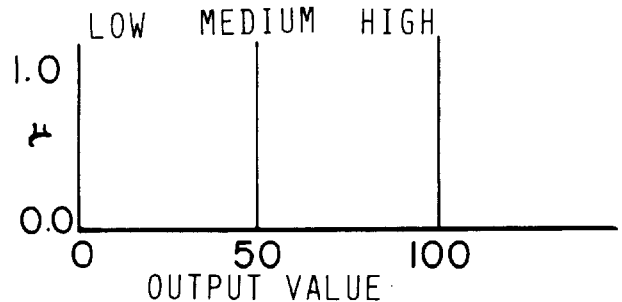
FIG. 15 is a graph of a proportional output membership function.
Figure 16:
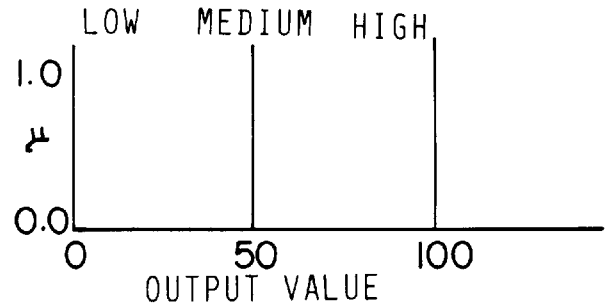
FIG. 16 is a graph of an integral output membership function.
Figure 17:
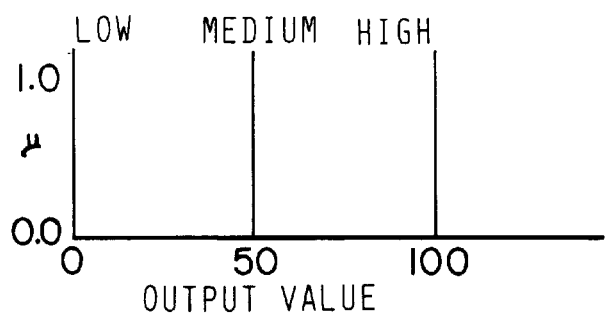
FIG. 17 is a graph of a derivative output membership function.

IF turbulence is moderate AND response time is moderate THEN proportional is medium IF turbulence is moderate AND response time is fast THEN proportional is high IF turbulence is high AND response time is slow THEN proportional is medium IF turbulence is high AND response time is moderate THEN proportional is high IF turbulence is high AND response time is fast THEN proportional is high Integral (Ki) output rules IF turbulence is calm AND response time is slow THEN integral is low IF turbulence is calm AND response time is moderate THEN integral is medium IF turbulence is calm AND response time is fast THEN integral is medium IF turbulence is moderate AND response time is slow THEN integral is medium IF turbulence is moderate AND response time is moderate THEN integral is medium IF turbulence is moderate AND response time is fast THEN integral is medium IF turbulence is high AND response time is slow THEN integral is medium IF turbulence is high AND response time is moderate THEN integral is medium IF turbulence is high AND response time is fast THEN integral is high Derivative (Kd) output rules IF turbulence is calm AND sensitivity is low THEN derivative is low IF turbulence is calm AND sensitivity is moderate THEN derivative is low IF turbulence is calm AND sensitivity is high THEN derivative is medium IF turbulence is moderate AND sensitivity is low THEN derivative is medium IF turbulence is moderate AND sensitivity is moderate THEN derivative is medium IF turbulence is moderate AND sensitivity is high THEN derivative is medium IF turbulence is high AND sensitivity is low THEN derivative is medium IF turbulence is high AND sensitivity is moderate THEN derivative is medium IF turbulence is high AND sensitivity is high THEN derivative is high The fuzzy outputs from the inference engine 504 must be converted from fuzzy logic values to crisp output values. This defuzzification process is achieved through output membership functions, which define a number of domains within the range of the output variable (universe of discourse). For example, the output parameters and membership functions for proportional output, integral output, and derivative output, as shown in FIGS. 15, 16 and 17, respectively, were chosen for the qualitative tuning system 500. Note that the membership functions are singletons whose values can be calculated using a weighted average technique.

As an example, let the turbulence index chosen by a user be 25 and the response time index chosen by a user be 50. Referring to FIG. 12, a turbulence index of 25 translates into a very calm value of $0.25\mu$ and a calm value of $0.25\mu$. Referring to FIG. 13, a response time index of 50 corresponds to a moderate value of $1.0\mu$. The sensitivity index chosen by the user is 0, corresponding to a value of 1.0 for very calm, as shown in FIG. 14. Thus, the crisp input values of 25 for the turbulence index, 50 for the response time, and 0 for the sensitivity index results in the fuzzy logic values of $0.25\mu$ for very calm and $0.25\mu$ for calm with respect to turbulence, $1.0\mu$ for moderate with respect to response time, and 1.0 for very calm with respect to sensitivity.

These fuzzy logic values are then applied to the proportional, integral and derivative output rules of the inference engine using the Min-Max method of rule evaluation. Under the Min-Max method of rule evaluation, the minimum value of the two input variables for a given consequent defines the output variable. In regard, the proportional output rules, the only rule that yields an output variable other than 0 is "IF turbulence is calm AND response time is moderate THEN proportional is low". Applying the fuzzy logic inputs to this rule results in an output variable for proportional with respect to low equal to 0.25, with respect to medium equal to 0 and with respect to high equal to 0.

For integral output, the only rule that yields a value other than 0 is "IF turbulence is calm AND response time is moderate THEN integral is medium". The value for integral with respect to medium equals 0.25. The value of integral with respect to low equals 0 and the value of integral with respect to high equals 0. For derivative, the value of low equals 0, the value of medium equals 0 and the value of high equals 0.

Fuzzy outputs must be converted from fuzzy logic values to crisp output values for the PID 603. Using the weighted average technique, crisp output=$\Sigma_i$(fuzzy out$_i$)·(output value$_i$)/$\Sigma_i$(fuzzy out$_i$)

The crisp output for proportional is determined with reference to FIG. 15. The proportional crisp output equals:

$$[(0.25 \times 0)_{low} + (0 \times 50)_{medium} + (0 \times 100)_{high}] \div [0.25 + 0 + 0] = 0.$$

The integral crisp output value equals:

$$[(0.0 \times 0)_{low} + (0.25 \times 50)_{medium} + (0 \times 100)] \div [0 + (0.25 \times 50) + 0]$$
$$= 12.5 \div 0.25 = 50.$$

The derivative output equals:

$$[(0 \times 0)_{low} + (0 \times 50)_{medium} + (0 \times 100)_{high}](0 + 0 + 0) = 0.$$

Thus, after the defuzzification process, the crisp output for proportional is equal to 0, the crisp output for integral is equal to 5 and the crisp output for derivative is equal to 0.

The present invention also pertains to a system for controlling a fume hood 14 having a sash 601 with a face 611, as shown in FIG. 18. The system 600 comprises at least one means for controlling air flow through the fume hood based on sash position and air flow face velocity. The controlling means preferably includes a microprocessor 599. This mode of face velocity with sash feedforward control is different than the modes of face velocity control only or flow with sash feedforward control described above. A microprocessor 22, for controlling two fume hoods 14, can also be part of the system 600. The microprocessor 22 is connected to the PUP network 16. Except for the automatic tunability feature and the additional control sequence for face velocity with sash feedforward and the preferred use of only one fume hood 14 connected to it, the microprocessor 599 in its preferred embodiment is identical to the embodiment described above and shown in FIGS. 3, 4, and 8. The system 600 is preferably also comprised of a controller 18 remote from the microprocessor 599 but in communication with the microprocessor 599. The system 600 preferably includes a telecommunications network connected to the controller 18 and the microprocessor 599 through which the controller 18 and the microprocessor 599 communicate.

The microprocessor 599 preferably includes a processor, such as a PID 603, for controlling air flow through the fume hood 14. Additionally, the microprocessor 599 preferably includes means for determining a desired face velocity connected to the processor. Moreover, the controlling means preferably includes a sash area sensor 600 in communication with the microprocessor 599.

The controlling means preferably also includes a damper 607 for controlling air flow through the fume hood 14. The damper 607 is in communication with the microprocessor 599. Moreover, the microprocessor 599 preferably includes means for moving the damper to a desired position in response to the sash area changing.

Referring to FIG. 9, the means for determining a desired face velocity includes a face velocity sensor 602 located at the face of the fume hood, connected to the measured variable input (MV) of the microprocessor 599 which preferably includes a PID 603. The means for determining a desired face velocity also includes a face velocity setpoint 604 that is connected to the setpoint input (SP) of the PID 603. The velocity setpoint 604 is connected to the SP input port of the PID 603 through switch 610. When switch 610 is toggled to its zero input, the velocity setpoint value is allowed to be transmitted therethrough.

The system 600 preferably also includes a sash area sensor 606 in communication with the PID 603 of the controlling means. The means or mechanism for moving the damper 607 to a desired position in response to the sash area 617 changing is preferably comprised of the following. There is a first multiplier 605 having an A input and a B input which then multiplies the A input by the B input. The A input is connected to the velocity setpoint 604 and the B input is connected to the sash area sensor 606. The multiplication of the velocity setpoint by the sash area results in a desired flow through the fume hood. A desired flow value that is produced by the first multiplier 605 is connected to a second multiplier 607. The second multiplier 607 has an A input which receives the desired flow value from the first multiplier 605 and also has a B input. The B input receives a feedforward gain which is multiplied by the flow value received by the A input to result in a first feedforward signal. The purpose of this feedforward feature is for the damper to be immediately moved to an expected position to maintain the desired flow through the fume hood within seconds of the movement of the sash rather than waiting for the flow through the fume hood to change after the sash is moved and then for the damper to be reactive to the actual change of flow. This is the same purpose as it is described above for flow based fume hood control. One could think analogously of a door being opened and for several seconds to pass before a flow of air comes through the door and is felt by the person standing in the doorway that has opened the door. By moving the damper 607 in advance to an expected position that would maintain the desired flow at the new sash position, instabilities of flow are reduced or eliminated. In situations where hazardous materials are present in the fume hood, this minimizes the risk of the materials potentially escaping into the room through the sash.

The first feedforward signal is provided to a summer 650 which is also connected to a feedforward offset which provides a feedforward offset signal thereto. The summer 650 adds the feedforward offset signal to the first feedforward signal and produces a second feedforward signal that is more tailored to the desired feedforward response of the damper. Feedforward offset is used to maintain a minimum feedforward signal at all times. The second feedforward signal is provided to the one input of the third switch 660. The third switch 660 also has a zero input which has a predefined zero value connected to it. When the third switch 660 is toggled to the one input, the second feedforward signal is passed through the third switch 660 to the feedforward (FF) input port of the PID 603. The second feedforward signal is then passed immediately through the PID 603 to the output thereof to immediately effect the damper to move the damper to a desired position in advance of the actual flow through the fume hood changing. If the feedforward feature is not used of the controlling means, then the zero input is toggled on the third switch 660 and a zero value is provided to the FF port resulting in no feedforward. The third switch 660 has the desired input passed therethrough based on whether the face velocity with sash feedforward mode or the flow with sash feedforward mode (as described above) is chosen. This choice is manifested through the or gate 618 which, through its A input or B input, receives a value indicating whether either of these modes have been chosen. If neither of these modes are chosen, then a zero value comes out of the or gate 618 causing a zero value to be passed through the feedforward indicating there is no feedforward present.

The desired flow from the first multiplier 605 is also provided to PID delay 630. The PID delay 630 receives the desired flow through its In input. The PID delay 630 also has a Max input that receives a maximum delta flow signal, and a Time input that receives a damper delay signal. The maximum delta flow is the largest flow change that occurs through the hood and is based on the specific hood being controlled. The damper delay provides the time it takes for the desired damper to go from a minimum to a maximum position. With this information, the PID delay 630 can determine how long it will take to move the damper from a given position to a new position based on the change in the sash position which appears in the new desired flow signal. The PID delay 630 produces an output signal which equals (the desired flow divided by the maximum delta flow) times (the damper delay time) resulting in a time value as the output of the PID delay 630. The time signal produced by the PID delay 630 is provided to a fourth switch 670 through its one input. If the feedforward feature is present through the fume hood, the fourth switch 670 is toggled by a signal from the or gate 618 to allow the time signal from the PID delay 630 to be provided to a hold input of the PID 603. When a value other than zero is received by the hold input of the PID 603, then the PID passes the second feedforward signal directly to the damper for the period of time provided by the time signal to the PID 603 through the hold input. In the event there is some obstruction in front of the sash, but the sash position does not change, for instance, when someone stands in front of the sash, then the face velocity sensor 602 will immediately sense the change in the face velocity and provide it to the MV input of the PID 603. The PID 603 through the velocity setpoint signal it receives in the SP input port then modifies the damper 607 position to maintain the desired face velocity.

Figure 7:
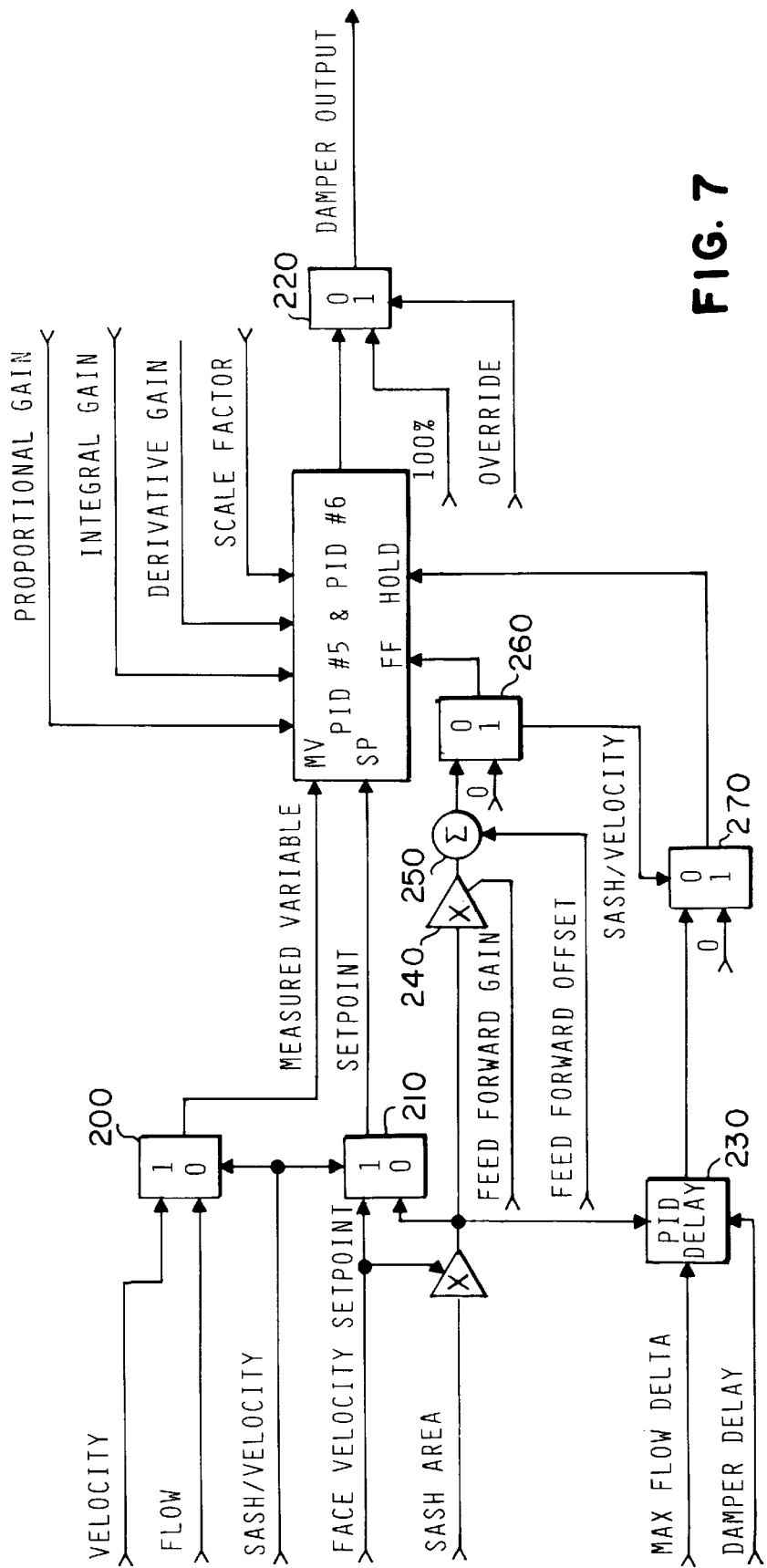
FIG. 7 is a schematic representation of a hood control circuit.
Figure 19:
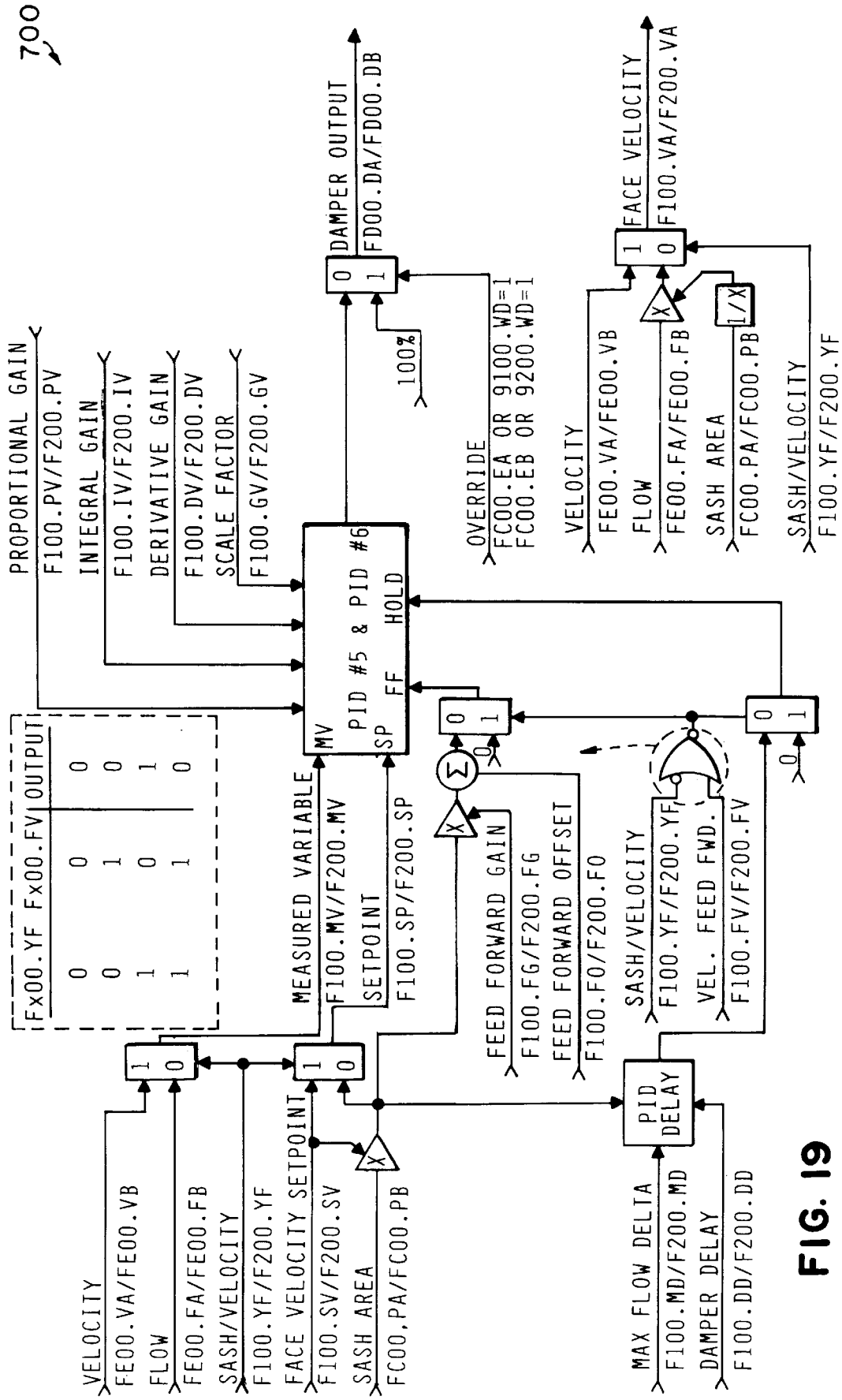
FIG. 19 is a schematic representation of another embodiment of a hood control circuit.

As shown in FIG. 19, a system 700 uses the same control sequences, just described, for controlling two fume hoods 14. FIG. 19 is similar to FIG. 7, except FIG. 19 also shows the face velocity with sash feedforward feature.

All the control sequences described herein can be used interchangeably alone or in conjunction with each other through processor 44 and memory of microprocessor 22 or microprocessor 598, which can be essentially the same as shown in FIG. 3 except the control sequence in FIG. 9 can be stored and operated in the microprocessor.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for controlling the face velocity of a fume hood, said fume hood having a face, a sash and an exhaust duct, said system comprising:

a face velocity sensor disposed at the face of said fume hood;

a sash area sensor capable of sensing the size of the open sash area of the fume hood;

an exhaust regulating mechanism disposed in the exhaust duct of said fume hood, said exhaust regulating mechanism capable of being adjusted to a plurality of operating settings for controlling the volumetric flow rate of air passing through the exhaust regulating mechanism;

a processor in communication with said face velocity sensor, sash area sensor and exhaust regulating mechanism, said processor further including means for receiving and storing a face velocity set point; said processor capable of adjusting said exhaust regulating mechanism in response to the sensed face velocity, sash area and face velocity set point.

2. The system described in claim 1 wherein said exhaust regulating mechanism is a damper.

3. The system described in claim 1 wherein said processor is microprocessor.

4. A system for controlling a fume hood to maintain a desired face velocity, said fume hood having a face, a sash, an exhaust duct, and an exhaust regulating mechanism disposed within said exhaust duct for regulating air flow exhausted from the fume hood through the exhaust duct, said exhaust regulating mechanism capable of being adjusted to a plurality of operating settings for controlling the volumetric flow rate of air passing through the mechanism, said system comprising:

a face velocity sensor disposed at the face of said fume hood, said sensor capable of generating a face velocity signal representative of the sensed air velocity;

a sash area sensor capable of sensing the size of the open sash area of the fume hood, said sensor capable of generating a sash area signal representative of the size of open sash area sensed;

means for generating a feed forward control signal based on the sensed open sash area;

means for adjusting said exhaust regulating mechanism in response to said feed forward control signal;

means for using said face velocity signal to further adjust the exhaust regulating mechanism to maintain the desired face velocity.

5. The system described in claim 4 wherein said exhaust regulating mechanism is a damper.

6. A system for controlling a fume hood to maintain a desired face velocity, said fume hood having a face, a sash, an exhaust duct, and an exhaust regulating mechanism disposed within said exhaust duct for regulating air flow exhausted from the fume hood through the exhaust duct, said exhaust regulating mechanism capable of being adjusted to a plurality of operating settings for controlling the volumetric flow rate of air passing through the mechanism, said system comprising:

a face velocity sensor, said face velocity sensor capable of generating a face velocity signal representative of the sensed air velocity;

a sash area sensor capable of sensing the size of the open sash area of the fume hood and generating a sash area signal representative of the size of open sash area sensed;

a processor in communication with said face velocity sensor and said sash area sensor;

a face velocity set point inputted into said processor, said face velocity set point representative of the desired face velocity sought to be maintained;

means for generating a feed forward control signal in response to the sash area signal and the face velocity set point;

means for transmitting said feed forward control signal to the exhaust regulating mechanism;

means for adjusting said exhaust regulating mechanism in response to said feed forward control signal;

means for adjusting said exhaust regulating mechanism in response to said face velocity signal, said means activated after the mechanism has been adjusted in response to the feed forward control signal.

7. The system described in claim 5 wherein said exhaust regulating mechanism is a damper.

8. The system described in claim 6 wherein said processor is a microprocessor.

9. The system as described in claim 6 wherein the means for generating the feed forward control signal further comprise:
   a multiplier disposed within said microprocessor and capable of generating a first feed forward gain by multiplying said sash area signal, the face velocity set point and a first feed forward gain factor;
   a summer disposed within said microprocessor and capable of generating the feed forward control signal by adding to said first feed forward gain a feed forward offset.

10. The system as described claim 6 wherein the means for adjusting said exhaust regulating mechanism in response to said feed forward control signal further comprises:
    means for generating a time delay signal representative of a time period sufficient for the exhaust regulating mechanism to complete the adjustment in operating position in response to receiving the feed forward control signal;
    means for holding control of the exhaust regulating mechanism to be responsive only to the feed forward control signal during the time delay;
    means for releasing the hold of the exhaust regulating mechanism upon expiration of the time delay.

11. A method of controlling a fume hood to maintain a desired face velocity, said fume hood having a face, a sash, an exhaust duct, and an exhaust regulating mechanism disposed within said exhaust duct for regulating air flow exhausted from the fume hood through the exhaust duct, said exhaust regulating mechanism capable of being adjusted to a plurality of operating settings for controlling the volumetric flow rate of air passing through the regulating mechanism, said method comprising the steps of:
    sensing, at the face of said fume hood, the face velocity of air flowing into the fume hood and generating a face velocity signal representative of the sensed air velocity;
    sensing the size of the open sash area of the fume hood and generating a sash area signal representative of the size of open sash area sensed;
    using said sash area signal as a feed forward control to adjust the exhaust regulating mechanism to a setting for producing an exhaust flow rate that will generate the desired face velocity;
    using said face velocity signal to further adjust the exhaust regulating mechanism to control the exhaust flow rate to achieve the desired face velocity.

12. The method of claim 11 wherein said exhaust regulating mechanism is a damper.

13. A method of controlling a fume hood to maintain a desired face velocity, said fume hood having a face, a sash, an exhaust duct, and an exhaust regulating mechanism disposed within said exhaust duct for regulating air flow exhausted from the fume hood through the exhaust duct, said exhaust regulating mechanism capable of being adjusted to a plurality of operating settings for controlling the volumetric flow rate of air passing through the exhaust regulating mechanism, said method comprising the steps of:
    sensing the size of the open sash area of the fume hood and generating a sash area signal representative of the size of open sash area sensed;
    transmitting said face velocity signal and said sash area signal to a processor;
    inputting into said processor a face velocity set point, said face velocity set point representative of the desired face velocity sought to be maintained;
    generating a feed forward control signal in response to the sash area signal and the face velocity set point;
    transmitting said feed forward control signal to the exhaust regulating mechanism;
    adjusting said exhaust regulating mechanism in response to said feed forward control signal;
    using said face velocity signal to further adjust the exhaust regulating mechanism to a setting for producing a flow rate that will generate the desired face velocity.

14. The method of claim 13 wherein said exhaust regulating mechanism is a damper.

15. The method of claim 13 wherein said processor is microprocessor.

16. The method of claim 13 wherein the step of generating the feed forward control signal further comprises the steps of:
    generating a first feed forward gain by multiplying said sash area signal, the face velocity set point and a first feed forward gain factor;
    generating the feed forward control signal by adding to said first feed forward gain a feed forward offset.

17. The method of claim 16 wherein said feed forward offset is used to generate a minimum feed forward control signal.

18. The method of claim 13 wherein the step of adjusting said exhaust regulating mechanism in response to said feed forward control signal further comprises the steps of:
    generating a time delay signal representative of a time period sufficient for the exhaust regulating mechanism to complete the adjustment in operating position in response to receiving the feed forward control signal;
    holding control of the exhaust regulating mechanism to be responsive only to the feed forward control signal during the time delay;
    releasing the hold of the exhaust regulating mechanism upon expiration of the time delay.

* * * * *